United States Patent
Hasegawa et al.

(10) Patent No.: US 7,092,218 B2
(45) Date of Patent: Aug. 15, 2006

(54) MAGNETIC HEAD COMPRISING MAGNETIC DOMAIN CONTROL LAYER FORMED ON ABS-SIDE OF MAGNETIC FLUX GUIDE FOR GMR ELEMENT AND METHOD OF MANUFACTURING THE MAGNETIC HEAD

(75) Inventors: Naoya Hasegawa, Niigata-ken (JP); Eiji Umetsu, Niigata-ken (JP)

(73) Assignee: Alps Electric Co., Ltd., Tokyo (JP)

( * ) Notice: Subject to any disclaimer, the term of this patent is extended or adjusted under 35 U.S.C. 154(b) by 212 days.

(21) Appl. No.: 10/464,708

(22) Filed: Jun. 17, 2003

(65) Prior Publication Data

US 2005/0073777 A1   Apr. 7, 2005

(30) Foreign Application Priority Data

Jun. 19, 2002   (JP)   ............................. 2002-177867

(51) Int. Cl.
*G11B 5/39*   (2006.01)
(52) U.S. Cl. .................................. 360/321; 360/324.12
(58) Field of Classification Search ................ 360/321
See application file for complete search history.

(56) References Cited

U.S. PATENT DOCUMENTS

| | | | |
|---|---|---|---|
| 5,898,547 A | 4/1999 | Fontana, Jr. et al. | 360/324.2 |
| 6,542,343 B1* | 4/2003 | Gill | 360/324.2 |
| 6,636,391 B1* | 10/2003 | Watanabe et al. | 360/321 |
| 6,671,136 B1* | 12/2003 | Arai et al. | 360/321 |
| 6,671,141 B1* | 12/2003 | Shimazawa et al. | 360/324.2 |
| 6,787,369 B1* | 9/2004 | Ishii et al. | 438/3 |
| 2001/0026423 A1 | 10/2001 | Arai et al. | 360/321 |
| 2001/0040777 A1 | 11/2001 | Watanabe et al. | 360/321 |
| 2001/0055184 A1 | 12/2001 | Shimazawa et al. | 360/324.2 |
| 2003/0137780 A1* | 7/2003 | Fontana et al. | 360/324.2 |

FOREIGN PATENT DOCUMENTS

| | | |
|---|---|---|
| JP | 2001-155313 | 6/2001 |
| JP | 2001-256617 | 9/2001 |
| JP | 2001-273613 | 10/2001 |
| JP | 2001-291214 | 10/2001 |
| WO | WO 02/43164 A1 | 4/2002 |

OTHER PUBLICATIONS

Fujitsu Scientific and Technical Journal. vol. 37 No. 5 Dec. 2001, H. Kanai et al, "Advanced Spin-Valve GMR Head" pp. 174-182

* cited by examiner.

*Primary Examiner*—Jefferson Evans
(74) *Attorney, Agent, or Firm*—Brinks Hofer Gilson & Lione

(57) ABSTRACT

The present invention provides a magnetic head including a magnetic flux guide layer for effectively inducing an external magnetic field in a free magnetic layer. A magnetic domain control layer is formed in a space below the magnetic flux guide layer and in front of a multilayer film near a surface facing a recording medium. Therefore, the shape of the magnetic flux guide layer can be made substantially flat to improve flux transmission efficiency. Also, the magnetization of the magnetic flux guide layer is controlled by laminating the magnetic flux guide layer on the magnetic domain control layer. Therefore, the magnetic domain control layer can be formed in a substantially flat thin film to stabilize a bias magnetic field to be supplied to the magnetic flux guide layer. Furthermore, the gap length of the magnetic head can be kept short.

18 Claims, 19 Drawing Sheets

US 7,092,218 B2

MAGNETIC HEAD COMPRISING MAGNETIC DOMAIN CONTROL LAYER FORMED ON ABS-SIDE OF MAGNETIC FLUX GUIDE FOR GMR ELEMENT AND METHOD OF MANUFACTURING THE MAGNETIC HEAD

This application claims the benefit of priority to Japanese Patent Application No. 2002-177867 filed on Jun. 19, 2002.

BACKGROUND OF THE INVENTION

1. Field of the Invention

The present invention relates to a magnetic detecting element mainly used for a hard disk device and magnetic sensor, and a method of manufacturing the same. Particularly the present invention relates to a magnetic detecting element having excellent detectivity to a magnetic field, and a method of manufacturing the same.

2. Description of the Related Art

FIG. 21 is a perspective view showing a conventional reproducing magnetic head.

A magnetic detecting element S constituting the magnetic head shown in FIG. 21 comprises a multilayer film comprising a pinned magnetic layer 101, a nonmagnetic material layer 102 and a free magnetic layer 103. Each of the pinned magnetic layer 101 and the free magnetic layer 103 is made of a ferromagnetic material such as NiFe or the like, and the nonmagnetic material layer 102 is made of Cu or the like.

The magnetization direction of the pinned magnetic layer 101 is pinned in a direction. On the other hand, the magnetization direction of the free magnetic layer 103 varies with the external magnetic field applied thereto. As a result, the relative magnetization direction of the free magnetic layer 103 and the pinned magnetic layer 101 varies to change the electric resistance of the magnetic detecting element S. The change in the electric resistance can be converted to a voltage change or current change to detect the external magnetic field. The free magnetic layer 103 is put 5 into a single magnetic domain state in which the magnetization direction is aligned in a direction, for suppressing the occurrence of Barkhausen noise.

In the magnetic head shown in FIG. 21, the magnetic detecting element S is retracted in the height direction (the 10 Y direction shown in the drawing) so as not to be exposed at the surface facing the recording medium.

In FIG. 21, reference numeral 104 denotes a lower shield layer made of a magnetic material such as a NiFe alloy or the like. Also, a lower gap layer made of an insulating material not shown in the drawing is formed on the lower shield layer 104, and a magnetic flux guide layer 105 is formed on the lower gap layer. The magnetic flux guide layer 105 is made of a magnetic material such as a CoFe alloy, a NiFe alloy, a CoFeNi alloy, Co, or the like. The magnetic flux guide layer 105 is magnetically connected to the free magnetic layer 103 of the magnetic detecting element S.

Furthermore, an upper gap layer not shown in the drawing is formed over the magnetic flux guide layer 105 and the magnetic detecting element S, and an upper shield layer 106 made of a magnetic material such as a NiFe alloy or the like is formed on the upper gap layer.

The front end 105a of the magnetic flux guide layer 105 is exposed at the surface facing the recording medium, and thus serves as an induction layer for inducing a change of magnetization in the free magnetic layer 103 of the magnetic detecting element S due to an external magnetic field. The change of magnetization induced in the magnetic flux guide layer 105 due to the external magnetic field is transmitted to the free magnetic layer 103 so that the magnetization direction of the free magnetic layer 103 changes with a change in the external magnetic field.

As shown in FIG. 21, in the magnetic head, the magnetic detecting element S is retracted from the surface facing the recording medium in the height direction to improve heat resistance to thermal asperity, as compared with a magnetic detecting element exposed at the surface facing the recording medium or a magnetic detecting element covered with only a thin protective film. It is also possible to improve the resistance to electrostatic damage caused by electrostatic charge of the surface facing the recording medium.

In the magnetic head shown in FIG. 21, if the magnetic domain of the magnetic flux guide layer 105 is not controlled to give a multidomain structure to the magnetic flux guide layer 105, Barkhausen noise occurs in transmission of a change of magnetization through the magnetic flux guide layer 105.

Therefore, the magnetization of the magnetic flux guide layer 105 as well as the magnetization of the free magnetic layer 103 must be controlled.

Japanese Unexamined Patent Application Publication No. 2001-273613 discloses a magnetoresistive sensor comprising a tunneling magnetoresistive film and a magnetic flux guide layer, wherein the magnetic domains of both a free magnetic layer and the magnetic flux guide layer are controlled.

However, in the magnetoresistive sensor shown in FIGS. 2, 3 and 4 of Japanese Unexamined Patent Application Publication No. 2001-273613, a magnetic flux guide layer 14 must be bent near the tunneling magnetoresistive film in order to connect a magnetic domain control single layer 15 to both a free layer 25 (free magnetic layer) and the magnetic flux guide layer 14, thereby decreasing the flux transmission efficiency of the magnetic flux guide layer 14.

Also, in the magnetoresistive sensor shown in FIG. 5 of Japanese Unexamined Patent Application Publication No. 2001-273613, the magnetic domains of the free magnetic layer 25 formed above the tunneling magnetoresistive film 13 and the magnetic flux guide layer formed below the tunneling magnetoresistive film 13 must be controlled by the magnetic domain control single layer 15. Therefore, the shape of the magnetic domain control layer 15 is complicated to cause a difficulty in appropriate domain control.

Furthermore, in the magnetoresistive sensor shown in FIGS. 6 and 9 of Japanese Unexamined Patent Application Publication No. 2001-273613, the magnetic domain control layer 15 or 45 is formed on the surface of the magnetic flux guide layer 14 or 44 formed below or above the tunneling magnetoresistive film 13 away from the surface facing the tunneling magnetoresistive film 13 to increase the thickness of the magnetoresistive sensor, thereby increasing the gap length.

SUMMARY OF THE INVENTION

The present invention has been achieved for solving the above problems of conventional magnetic heads, and an object of the present invention is to provide a magnetic head suitable for miniaturization and capable of effectively controlling the magnetic domain of a magnetic flux guide layer which is magnetically connected to a free magnetic layer, and a method of manufacturing the magnetic head.

A magnetic head of the present invention comprises a multilayer film comprising a pinned magnetic layer, a nonmagnetic material layer and a free magnetic layer, which are laminated in that order from the bottom, the multilayer film being formed at a predetermined distance from a surface facing a recording medium in the height direction, and a magnetic flux guide layer comprising a ferromagnetic material and magnetically connected to the free magnetic layer, wherein the magnetic flux guide layer extends from the top of the free magnetic layer to the surface facing the recording medium, and a magnetic domain control layer is formed below the magnetic flux guide layer, for aligning the magnetization direction of the magnetic flux guide layer in a direction.

In the present invention, the free magnetic layer is formed above the pinned magnetic layer, and the magnetic flux guide layer is formed on the free magnetic layer so as to extend to the surface facing the recording medium. Therefore, a space is formed below the magnetic flux guide layer. In the present invention, therefore, the magnetic domain control layer is formed in the space, and thus the shape of the magnetic flux guide layer can be made substantially flat, thereby improving the flux transmission efficiency.

In the present invention, the magnetization of the magnetic flux guide layer can be controlled merely by laminating the magnetic flux guide layer on the magnetic domain control layer, and thus the magnetic domain control layer can be formed in a substantially flat thin film layer, thereby permitting the supply of a stable bias magnetic field.

In the magnetic head of the present invention, the gap length can easily be shortened.

In another aspect of the present invention, a magnetic head comprises a multilayer film comprising a pinned magnetic layer and a nonmagnetic material layer which are laminated in that order from the bottom, the multilayer film being formed at a predetermined distance from a surface facing a recording medium in the height direction, and a magnetic flux guide layer comprising a ferromagnetic material and formed on the nonmagnetic material layer, wherein the magnetic flux guide layer extends from the top of the nonmagnetic material layer to the surface facing the recording medium, and a magnetic domain control layer is formed below the magnetic flux guide layer, for aligning the magnetization direction of the magnetic flux guide layer in a direction.

In the present invention, when the magnetization direction of the magnetic flux guide layer changes with an external magnetic field, the relative magnetization direction of a region of the magnetic flux guide layer, which is disposed on the nonmagnetic material layer, and the pinned magnetic layer changes to change the total electric resistance of the magnetic flux guide layer and the multilayer film. The change in the total electric resistance is converted into a current change or voltage change to detect the external magnetic field (recording signal magnetic field). In the present invention, the magnetic domain control layer is formed in the space below the magnetic flux guide layer, and thus the shape of the magnetic flux guide layer is substantially flattened, thereby improving the flux transmission efficiency. Also, the magnetic domain control layer can be formed in a substantially flat thin film layer, thereby permitting the supply of a stable bias magnetic field. Also, in the magnetic head, the gap length can easily be shortened.

The magnetic domain control layer is preferably disposed in front of the multilayer film near the surface facing the recording medium, for flattening the magnetic flux guide layer and narrowing the gap of the magnetic head.

In the present invention, the magnetic flux guide layer also extends to the rear of the multilayer film in the height direction, and a magnetic domain control layer is preferably formed below the expending portion of the magnetic flux guide layer, which extends to the rear in the height direction, for aligning the magnetization direction of the magnetic guide layer in a direction. This is because the magnetization of the magnetic flux guide layer can be more securely controlled.

When the magnetic flux guide layer extends to the rear of the multilayer film in the height direction, the magnetic domain control layer is preferably disposed behind the multilayer film in the height direction.

A nonmagnetic intermediate layer may be interposed between the magnetic domain control layer and the magnetic flux guide layer. The nonmagnetic intermediate layer can control the magnitude of a bias magnetic field between the magnetic domain control layer and the magnetic flux guide layer.

In the present invention, a ferromagnetic layer may be formed between the magnetic domain control layer and the magnetic flux guide layer.

When the nonmagnetic intermediate layer is interposed between the magnetic domain control layer and the ferromagnetic layer, the magnitude of a bias magnetic field between the magnetic domain control layer and the ferromagnetic layer can be controlled.

A nonmagnetic layer may be formed between the free magnetic layer and the magnetic flux guide layer. The magnetization directions of the free magnetic layer and the magnetic flux guide layer are defined to be parallel or antiparallel to each other according to the thickness of the nonmagnetic layer formed between the free magnetic layer and the magnetic flux guide layer.

In the present invention, longitudinal bias layers are formed on both sides of the multilayer film in the track width direction. When the longitudinal bias layers are magnetically connected to the magnetic flux guide layer, the magnetization of the magnetic flux guide layer can be securely controlled.

In the present invention, for example, a tab layer is formed to extend in the track width direction and to be magnetically connected to the magnetic flux guide layer, so that the magnetization direction of the tab layer can be aligned in a direction by the longitudinal bias layers formed on both sides of the multilayer film in the track width direction.

In the present invention, the magnetic flux guide layer and the tab layer can be formed as a single layer comprising a ferromagnetic material.

The longitudinal bias layers are preferably formed below the tab layer.

When the longitudinal bias layers are formed below the tab layer, the shape of the tab layer can be flattened to improve a magnetization fixing force.

The magnetization of the tab layer can be controlled only by laminating the tab layer on the longitudinal bias layers, and thus the longitudinal bias layers can be formed in substantially flat thin film layers, thereby permitting the supply of a stable bias magnetic field.

In the magnetic head of the present invention, the gap length can easily be shortened.

In the present invention, a nonmagnetic intermediate layer may be interposed between the longitudinal bias layers and the tab layer. The nonmagnetic intermediate layer can control the magnitude of a bias magnetic field between the longitudinal bias layers and tab layer.

In the present invention, a ferromagnetic layer may be formed between the longitudinal bias layers and the tab layer.

When the nonmagnetic intermediate layer is interposed between the longitudinal bias layers and the ferromagnetic layer, the magnitude of a bias magnetic field between the longitudinal bias layers and the ferromagnetic layer can be controlled.

In the present invention, the magnetic domain control layer and the longitudinal bias layers are formed to a same thickness to flatten the magnetic flux guide layer and the tab layer.

The magnetic domain control layer and the longitudinal bias layers are preferably made of the same material.

When the longitudinal bias layers and the tab layer are provided, the magnetic domain control layer formed directly below the magnetic flux guide layer can be omitted.

The magnetic domain control layer and/or the longitudinal bias layers can be made of an antiferromagnetic material or a hard magnetic material.

A method of manufacturing a magnetic head of the present invention comprises the following steps:

(a) A step of laminating in turn a pinned magnetic layer, a nonmagnetic material layer, a free magnetic layer, and a nonmagnetic layer composed of at least one of Cr, Ru, Re, Pd, Os, Ir, Pt, Au, Rh, and Cu on a substrate to form a multilayer film.

(b) A step of removing a predetermined region of the multilayer film near a surface facing a recording medium.

(c) A step of forming a magnetic flux guide layer on the multilayer film so that the magnetic flux guide layer is magnetically connected to the free magnetic layer.

In the present invention, the nonmagnetic layer is formed on the free magnetic layer, and the magnetic flux guide layer is formed on the nonmagnetic layer. Therefore, the magnetic flux guide layer can be securely magnetically connected to the free magnetic layer.

The reason for this is that the nonmagnetic layer is made of at least one of Cr, Ru, Re, Pd, Os, Ir, Pt, Au, Rh, and Cu. The nonmagnetic material is less oxidized, or oxidization of the nonmagnetic material little proceeds in the thickness direction. Therefore, even if the nonmagnetic layer is oxidized in the manufacturing process, an oxide layer can be removed by the low-energy ion milling described below, thereby preventing the deterioration in magnetic properties of the free magnetic layer.

The method preferably further comprises, between the steps (b) and (c), a step (d) of forming a magnetic domain control layer in front of the multilayer film near the surface facing the recording medium.

In the step (c), the magnetic flux guide layer is also preferably formed on the magnetic domain control layer.

In the present invention, in the step (c), the magnetic domain control layer can be formed in front of the multilayer film near the surface facing the recording medium, and the magnetic flux guide layer can be laminated on the magnetic domain control layer to form the magnetic flux guide layer magnetically connected to the free magnetic layer.

As a result, the magnetic domain control layer can be formed in a substantially flat thin film to permit the supply of a stable bias magnetic field. Furthermore, the shape of the magnetic flux guide can be made substantially flat to improve the flux transmission efficiency.

In the present invention, the gap length of the magnetic head can be easily shortened.

In the present invention, in order to form a magnetic head in which the magnetic flux guide layer extends to the rear of the multilayer film in the height direction, and a magnetic domain control layer is formed below the extending portion of the magnetic flux guide layer, which extends to the rear in the height direction, the method further comprises the following steps in addition to the steps (a) to (d):

(e) A step of removing a predetermined back region of the multilayer film in the height direction.

(f) A step of forming a magnetic domain control layer at the back of the multilayer film in the height direction.

(g) A step of forming a magnetic flux guide layer on the magnetic domain control layer so that the magnetic flux guide layer is magnetically connected to the free magnetic layer.

In the present invention, the nonmagnetic layer formed on the free magnetic layer is preferably partially or entirely removed before the magnetic flux guide layer is formed. The nonmagnetic layer formed on the free magnetic layer functions as a protective layer for protecting the free magnetic layer from oxidation due to air exposure.

In the present invention, the method may further comprise, between the steps (c) and (d) and/or the steps (f) and (g), the following step:

(h) A step of forming a ferromagnetic layer between the magnetic domain control layer and the magnetic flux guide layer.

The method may further comprise, between the steps (h) and (d) and/or the steps (h) and (g), the following step:

(i) A step of forming a nonmagnetic intermediate layer between the magnetic domain control layer and the ferromagnetic layer.

In the present invention, the method preferably further comprises, between the steps (c) and (d) and/or the steps (f) and (g), the following step:

(j) A step of forming a nonmagnetic intermediate layer on the magnetic domain control layer or the ferromagnetic layer, and partially or entirely removing the nonmagnetic intermediate layer before laminating the magnetic flux guide layer.

The nonmagnetic layer formed in the step (j) functions as a protective layer for protecting the magnetic domain control layer or the ferromagnetic layer from oxidation due to air exposure.

In the present invention, in the step (d), a tab layer extending in the track width direction can be formed integrally with the magnetic flux guide layer.

The method preferably comprises a step of removing both sides of the multilayer film in the track width direction, forming longitudinal bias layers on both sides of the multilayer film in the track width direction, and then forming the tab layer on the longitudinal bias layers.

In the present invention, the magnetic domain control layer and the longitudinal bias layers can be formed simultaneously.

The magnetic domain control layer and the longitudinal bias layers are preferably formed by using the same material.

In the present invention, the magnetic domain control layer and/or the longitudinal bias layers may comprise an antiferromagnetic material or hard magnetic material.

DESCRIPTION OF THE PREFERRED EMBODIMENTS

Figure 1:
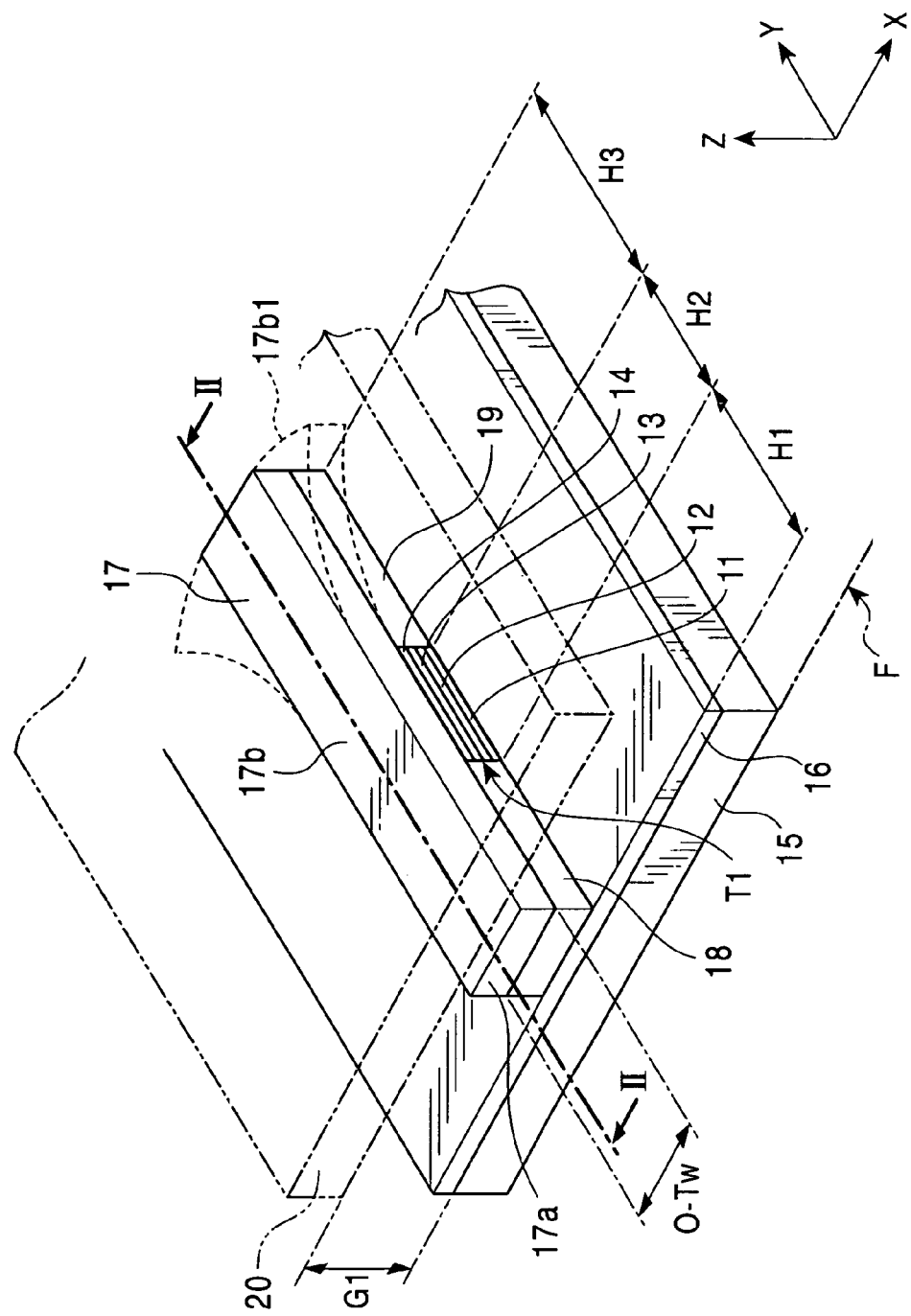
FIG. 1 is a schematic partial perspective view showing a magnetic head according to a first embodiment of the present invention.

FIG. 1 is a perspective view schematically showing a magnetic head according to a first embodiment of the present invention.

The magnetic head shown in FIG. 1 is a magnetic head for reproducing a recording signal magnetically recorded on a recording medium.

In FIG. 1, a multilayer film T1 comprising an antiferromagnetic layer 11, a pinned magnetic layer 12, a nonmagnetic material layer 13, and a free magnetic layer 14 is formed on a lower gap layer 16 laminated on a lower shield layer 15 to be disposed at a predetermined distance H1 from a surface F facing a recording medium in the height direction.

The multilayer film T1 serves as a magnetic detecting element having a magnetoresistive effect, for example, such as a spin-valve GMR magnetoresistive element or spin-valve tunneling magnetoresistive element. The detailed structure of the multilayer film T1 will be described below.

Also, a magnetic flux guide layer 17 is connected to the free magnetic layer 14 of the multilayer film (magnetic detecting element) T1.

Furthermore, an upper shield layer 20 is laminated on the magnetic flux guide layer 17 with an upper gap layer (not shown) provided therebetween and comprising a nonmagnetic material.

The lower shield layer 15 and the upper shield layer 20 are formed by plating or sputtering a magnetic material such as NiFe or the like. The lower gap layer 16 and the upper gap layer are formed by sputtering a nonmagnetic metal material such as Ta, Cr, or the like, or an insulating material such as $Al_2O_3$, $SiO_2$, or the like.

The magnetic head of this embodiment is formed at the trailing-side end of a slider comprising, for example, alumina-titanium carbide ($Al_2O_3$—TiC). The surface of the slider, which is opposite to the surface facing the recording medium, is bonded to an elastic deformable supporting member made of a stainless-steel material to form a magnetic head device.

In the present invention, a recording inductive head may be laminated on the magnetic head. In this case, the upper shield layer may be also used as a lower core layer of the inductive head.

The surface F facing the recording medium is perpendicular to, for example, the film surface of each of the thin films constituting the multilayer film T1, and parallel to the magnetization direction of the free magnetic layer of the magnetic detecting element with no external magnetic field applied. In FIG. 1, the surface F facing the recording medium is parallel to the X-Z plane. When the magnetic detecting element is used for a flying magnetic head, the surface F facing the recording medium corresponds to a so-called ABS.

In the description below, the track width direction means the width direction of a region in which a magnetization direction varies with an external magnetic field, for example, the magnetization direction of the free magnetic layer with no external magnetic field applied. Namely, the track width direction coincides with the X direction shown in the drawing.

The recording medium faces the surface F of the magnetic head, and moves in the Z direction shown in the drawing. The direction of a leakage magnetic field from the recording medium coincides with the Y direction shown in the drawing.

The magnetic flux guide layer 17 comprises a magnetic material such as a CoFe alloy, a NiFe alloy, a CoFeNi alloy, a NiFeNb alloy, an amorphous Co—Nb—Zr alloy, a Fe—Zr—O alloy, Co, or the like.

The front end 17a of the magnetic flux guide layer 17 is exposed at the surface F facing the recording medium, or in contact with the bottom of a protective thin layer formed on the surface F facing the recording medium.

The magnetic flux guide layer 17 serves as an induction layer for inducing a change of magnetization in the free magnetic layer 14 of the multilayer film (magnetic detecting) element T1 due to an external magnetic field (a leakage magnetic field from the recording medium). The change of magnetization of the magnetic flux guide layer 17, which is induced by the external magnetic field, is transmitted to the free magnetic layer 14 so that the magnetization direction of the free magnetic layer 14 varies with changes in the external magnetic field.

On the other hand, the magnetization direction of the pinned magnetic layer 12 is pinned in the Y direction by an exchange coupling magnetic field produced between the pinned magnetic layer 12 and the antiferromagnetic layer 11.

Consequently, the relative magnetization-direction of the free magnetic layer 14 and the pinned magnetic layer 12 varies to change the electric resistance of the multilayer film (magnetic detecting element) T1. The change in the electric resistance is converted to a voltage change or current change to detect the external magnetic field.

In this embodiment, the optical track width O-Tw of the magnetic head is defined by the width dimension of the front end 17a of the magnetic flux guide layer 17 in the track width direction, the front end 17a being exposed at the surface F facing the recording medium or in contact with the bottom of the protective layer formed on the surface F facing the recording medium. In the magnetic detecting element of this embodiment, the optical track width O-Tw is 0.1 μm or less, particularly 0.08 μm or less, so as to make the magnetic detecting element adaptable for a recording density of 200 Gbit/in$^2$ or more.

The predetermined distance H1 from the surface F facing the recording medium in the height direction is preferably in the range of 0.03 μm to 0.2 μm so that the magnetic flux guide layer 17 can securely induce a change of magnetization in the free magnetic layer 14 due to the external magnetic field (leakage magnetic field from the recording medium). The length H3 of the rear end portion 17b of the magnetic flux guide layer 17 in the height direction is preferably in the range of 0.1 μm to 0.5 μm.

The length H2 of the multilayer film T1 in the height direction is preferably in the range of 0.05 μm to 0.2 μm. Although the length (not shown in FIG. 1) of the multilayer film T1 in the track width direction depends upon recording format specifications such as the track density, the track pitch, and the like, the length is preferably in the range of, for example, 0.06 μm to 0.2 μm with a recording density of 100 Gb/in$^2$ or more.

The thickness of the magnetic flux guide layer 17 is preferably in the range of 30 Å to 100 Å.

In this embodiment, the multilayer film T1 is a so-called bottom spin-valve magnetic detecting element in which the free magnetic layer 14 is laminated on the pinned magnetic layer 12, and the antiferromagnetic layer 11 is disposed below the pinned magnetic layer 12.

The magnetic flux guide layer 17 extends from the top of the free magnetic layer 14 to the surface facing the recording medium, and a magnetic domain control layer 18 is formed below the magnetic flux guide layer 17 to be disposed in front of the multilayer film T1 near the surface F facing the recording medium.

The magnetic flux guide layer 17 further extends to the rear of the multilayer film T1 in the height direction (the Y direction shown in the drawing), and a magnetic domain control layer 19 is formed below the rear end 17b of the magnetic flux guide layer 17, which extends to the rear in the height direction, to be disposed behind the multilayer film T1 in the height direction.

The magnetization direction of the magnetic flux guide layer 17 is aligned in the track width direction (the X direction shown in the drawing) or in a direction antiparallel to the track width direction due to magnetic coupling with the magnetic domain control layers 18 and 19.

The free magnetic layer 14 is magnetically connected to the magnetic flux guide layer 17, and thus the magnetization direction of the free magnetic layer 14 is aligned in the track width direction (the X direction shown in the drawing) or in a direction antiparallel to the track width direction.

Each of the magnetic domain control layers 18 and 19 comprises an antiferromagnetic material or hard magnetic material.

Although not shown in FIG. 1, a nonmagnetic intermediate layer and a ferromagnetic layer are interposed between each of the magnetic domain control layers 18 and 19 and the magnetic flux guide layer 17. These layers will be described below.

In this embodiment, the magnetic domain control layer 18 is formed in the space below the magnetic flux guide layer 17 and in front of the multilayer film T1 near the surface F facing the recording medium. Therefore, the shape of the magnetic flux guide layer 17 can be made substantially flat, thereby improving the magnetic flux transmission efficiency.

Since the magnetic flux guide layer 17 is laminated on the magnetic domain control layer 18 for controlling the magnetization of the magnetic flux guide layer 17, the magnetic domain control layer 18 can be formed in a substantially flat thin film to stabilize a bias magnetic field to be supplied to the magnetic flux guide layer 17.

Also, the magnetic domain control layer 18 is formed in the space in front of the multilayer film T1 near the surface F facing the recording medium, and the magnetic domain control layer 19 is formed in the space behind the multilayer film T1 in the height direction. Therefore, even when the magnetic domain control layers 18 and 19 are formed, an increase in the total thickness dimension of the magnetic head can be suppressed. Namely, the gap length G1 of the magnetic head can be easily kept short. The gap length G1 of the magnetic head is defined by the distance between the lower shield layer 15 and the upper shield layer 20 at the surface F facing the recording medium.

In this embodiment, the rear end 17b of the magnetic flux guide layer 17 extends to the rear of the multilayer film T1 in the height direction, and thus the magnetization of the magnetic flux guide layer 17 can be more securely controlled. However, even when the magnetic flux guide layer 17 is formed only between the top of the free magnetic layer 14 and the surface F facing the recording medium without having the rear end 17b, the magnetic flux guide layer 17 can exhibit the function as the induction layer for inducing a change of magnetization in the free magnetic layer 14 due to the external magnetic field.

The magnetic flux guide layer 17 preferably has a sector rear end 17b1, as shown by dotted line in FIG. 1 because a demagnetizing field can be decreased.

In this embodiment, the gap length G1 of the magnetic head corresponds to the distance between the lower shield layer 15 and the upper shield layer 20 at the surface F facing the recording medium. Therefore, even if the total thickness of the multilayer film T1 formed at the predetermined distance HI from the surface F facing the recording medium in the height direction is large, a narrower gap can be achieved by decreasing the distance between the lower shield layer 15 and the upper shield layer 20 at the surface F facing the recording medium.

As described above, the magnetic head of this embodiment is formed on the slider. The slider flies due to an airflow produced when the disk-shaped recording medium rotates. In order to achieve high reproduced output of the magnetic head with a recent recording medium having a higher recording density, the flying amount of the magnetic head above the recoding medium has been decreased. Therefore, in future, the magnetic head will be possibly brought into a pseudo contact state in which the magnetic head flies in near contact with the recording medium, or a contact state in which the magnetic head flies in contact with the recording medium.

When the surface F of the magnetic head, which faces the recording medium, slides on the recording medium in the pseudo contact state or contact state, the magnetic head generates heat to cause spike-like noise referred to as "thermal asperity", or the magnetic head is charged with static electricity to easily cause electrostatic damage of the multilayer film T1.

In the present invention, the multilayer film T1 is retracted by the distance H1 from the surface F of the magnetic head which faces the recording medium in the height direction. Therefore, heat resistance to the thermal asperity is improved, as compared with a multilayer film exposed at the surface F facing the recording medium or covered with a thin protective film. Also, resistance to the electrostatic damage due to electrostatic charge of the surface F facing the recording medium can be improved.

The present invention is particularly effective to a case in which the multilayer film T1 is a CPP (current perpendicular to the plane) type magnetic detecting element. The CPP type has a structure in which a pair of electrode layers is provided at the top and the bottom of the multilayer film T1, for example, at the top of the magnetic flux guide layer 17 and the bottom of an underlying layer 21 (shown in FIG. 2), so that a current from the electrode layers flows through the multilayer film T1 perpendicularly to the film plane of each of the layers of the multilayer film T1.

When the nonmagnetic material layer 13 of the multilayer film T1 comprises a nonmagnetic conductive material, the CPP-type magnetic detecting element is referred to as a "CPP-GMR element" (spin-valve GMR magnetoresistive element), while when the nonmagnetic material 13 comprises an insulating material, the CPP-type magnetic detecting element is referred to as a "CPP-TMR element" (spin-valve tunneling magnetoresistive element). The structure of the CPP-type magnetic detecting element is suitable for improving the magnetic-field detection sensitivity of the magnetic detecting element having an optical track width of 0.1 µm or less.

In order to improve a change ΔR in the resistance of the CPP-GMR element, the absolute value of the electric resistance of the multilayer film T1 must be increased. Therefore, it is effective to increase the thickness of each of the layers constituting the multilayer film T1.

In the present invention, the multilayer film T1 is formed at the predetermined distance H1 from the surface F facing the recording medium in the height direction. Therefore, even if the total thickness of the multilayer film T1 is increased, a narrower gap can be achieved by decreasing the distance between the lower shield layer 15 and the upper shield layer 20 at the surface F facing the recording medium.

The tunneling magnetoresistive element uses the tunneling effect for producing a change in resistance. When the magnetization directions of the pinned magnetic layer 12 and the free magnetic layer 14 are antiparallel to each other, a tunneling current is most difficult to flow through the nonmagnetic material layer 13, and thus the resistance becomes maximum. On the other hand, when the magnetization directions of the pinned magnetic layer 12 and the free magnetic layer 14 are parallel to each other, the tunneling current most easily flows, and thus the resistance becomes minimum.

On the basis of this principle, a change in the electric resistance with a change in magnetization of the free magnetic layer 14 due to the influence of the external magnetic field is converted into a voltage change (in a constant-current operation) or a current change (in a constant-voltage operation) to detect a leakage magnetic field from the recording medium.

Since the nonmagnetic material layer 13 of the tunneling magnetoresistive element is formed to a small thickness (1 Å to several Å) so as to produce the tunneling effect, a short circuit easily occurs between the pinned magnetic layer 12 and the free magnetic layer 14. However, in the present invention, the multilayer film T1 is not exposed at the surface F facing the recording medium, and thus insulation between the pinned magnetic layer 12 and the free magnetic layer 14 can be easily maintained by the nonmagnetic material layer 13.

In the present invention, a pair of electrode layers may be provided on both sides of the multilayer film T1 in the track width direction (the X direction shown in the drawing) so that a current from the electrode layers flows through the multilayer film T1 in parallel to the film plane of each of the layers. In this case, the multilayer film T1 serves as the CIP (current-in the plane) type spin-valve GMR magnetoresistive element.

In the CIP type, each of the lower gap layer 16 and the upper gap layer must be made of an insulating material such as alumina, $SiO_2$ or the like, and insulating layers 31 made of alumina or the like are preferably formed below the magnetic domain control layers 18 and 19.

Figure 2:
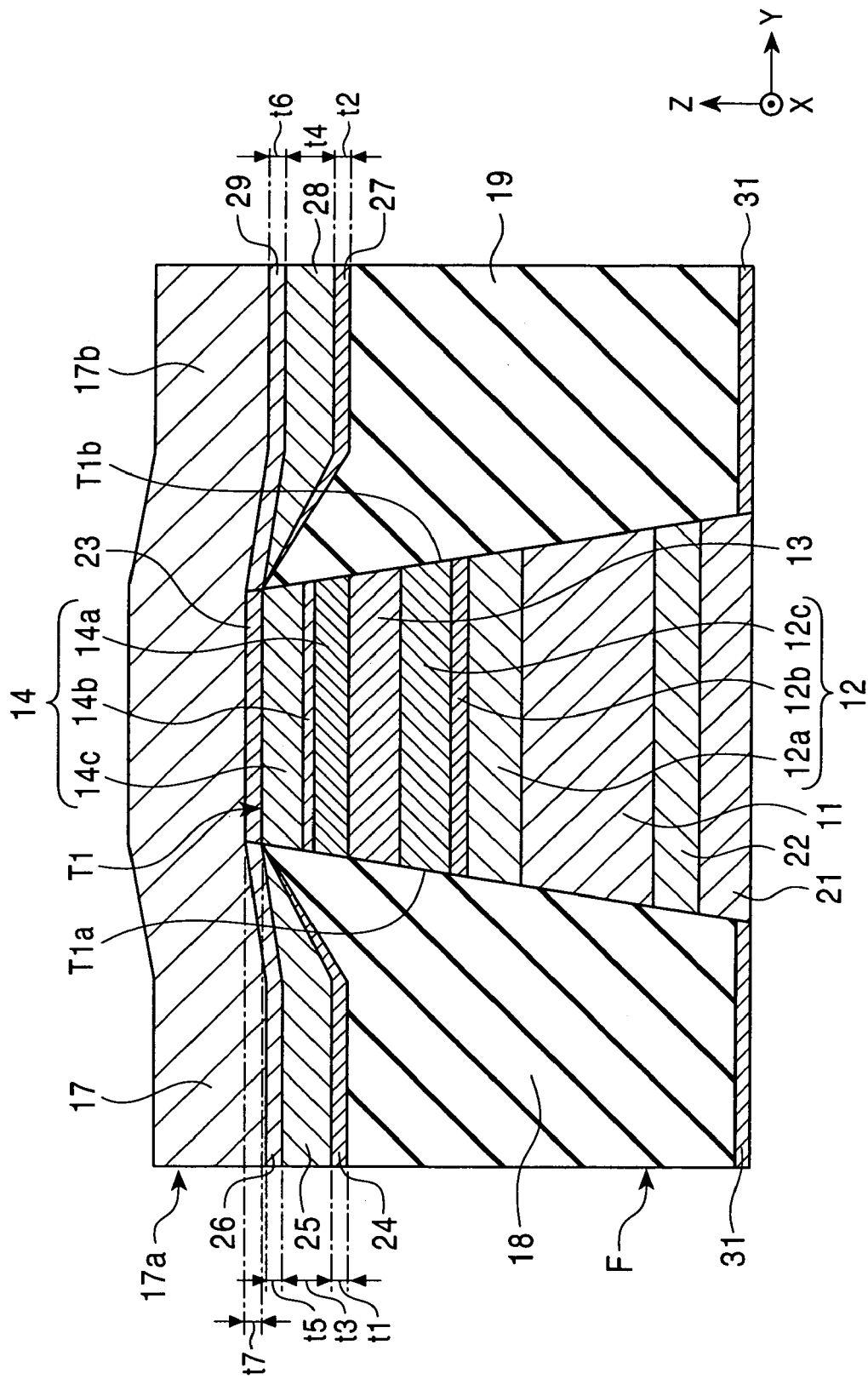
FIG. 2 is a longitudinal sectional view showing the magnetic head shown in FIG. 1 taken along line II—II, as viewed from an arrow direction.

FIG. 2 is a longitudinal sectional view of the magnetic head of the first embodiment taken along line II—II in FIG. 1, as viewed from an arrow direction. In FIG. 2, the lower shield layer 15, the lower gap layer 16 and the upper shield layer 20 are not shown.

First, the structure of the multilayer film T1 will be described in detail.

The multilayer film T1 comprises the underlying layer 21, a seed layer 22, the antiferromagnetic layer 11, the synthetic ferrimagnetic pinned magnetic layer 12 comprising a first pinned magnetic layer 12a, a nonmagnetic intermediate layer 12b, and a second pinned magnetic layer 12c, the nonmagnetic material layer 13, the synthetic ferrimagnetic free magnetic layer 14 comprising a second free magnetic layer 14a, a nonmagnetic intermediate layer 14b, and a first free magnetic layer 14c, and the nonmagnetic layer 23, which are laminated in that order from the bottom.

In the multilayer film T1, the relative angle between the magnetization directions of the second pinned magnetic layer 12c and the second free magnetic layer 14a contributes directly to a magnetoresistive change, and the angle is preferably a right angle with a sensing current supplied and with no signal magnetic field applied.

The underlying layer 21, the seed layer 22, the antiferromagnetic layer 11, the pinned magnetic layer 12, the nonmagnetic material layer 13, the free magnetic layer 14, and the nonmagnetic layer 23 are formed by a thin film forming process such as a sputtering process, an evaporation process, or the like.

As shown in FIG. 2, the front end surface T1a and rear end surface T1b of the multilayer film T1 comprising the layers from the underlying layer 21 to the nonmagnetic layer 23 are inclined surfaces each of which continues from the bottom of the underlying layer 21 to the top of the nonmagnetic layer 23.

The underlying layer 21 is preferably made of at least one of Ta, Hf, Nb, Zr, Ti, Mo and W. The underlying layer 21 is formed to a thickness of about 50 Å or less. The underlying layer 21 need not be formed.

The seed layer 22 is made of NiFe, NiFeCr, Cr, or the like.

The antiferromagnetic layer 11 is made of a PtMn alloy, a X—Mn (wherein X is at least one element of Pd, Ir, Rh, Ru, and Os) alloy, or a Pt—Mn—X' (wherein X' is at least one element of Pd, Ir, Rh, Ru, Au, Ag, Os, Cr, Ni, Ar, Ne, Xe, and Kr) alloy.

Although these alloys have a disordered face centered cubic structure (fcc) immediately after deposition, the fcc structure is transformed to a CuAuI-type ordered face-centered tetragonal structure (fct) by heat treatment.

The thickness of the antiferromagnetic layer 11 is, for example, 80 to 300 Å near the center in the track width direction.

In the PtMn alloy or an alloy represented by the formula X—Mn for forming the antiferromagnetic layer 11, Pt or X is preferably in the range of 37 to 63 atomic %, and more preferably in the range of 47 to 57 atomic %.

In an alloy represented by the formula Pt—Mn—X', X'+Pt is preferably in the range of 37 to 63 atomic %, and more preferably in the range of 47 to 57 atomic %. In an alloy represented by the formula Pt—Mn—X', X' is preferably in the range of 0.2 to 10 atomic %. However, when X' is at least one element of Pd, Ir, Rh, Ru, Os and Ni, X' is preferably in the range of 0.2 to 40 atomic %.

By using any one of the alloys, the antiferromagnetic layer producing a great exchange coupling magnetic field can be obtained by heat treatment. Particularly, in the use of the PtMn alloy, the excellent antiferromagnetic layer 11 having an exchange coupling magnetic field of 48 kA/m or more, for example, over 64 kA/m, and a high blocking temperature of 380° C. at which the exchange coupling magnetic field is lost can be obtained.

In FIG. 2, the first pinned magnetic layer 12a and the second pinned magnetic layer 12c having different magnetic thicknesses (Ms×t; product of saturation magnetization and thickness) are laminated with the nonmagnetic intermediate layer 12b provided therebetween to form a laminate functioning as a pinned magnetic layer.

Each of the first and second pinned magnetic layers 12a and 12c comprises a ferromagnetic material, for example, a NiFe alloy, Co, a CoFeNi alloy, a CoFe alloy, a CoNi alloy, or the like, and preferably a CoFe alloy or Co. The first and second pinned magnetic layers 12a and 12c preferably comprise the same material.

The nonmagnetic intermediate layer 12b comprises a nonmagnetic material, for example, at least one of Ru, Rh, Ir, Cr, Re, and Cu, or an alloy of at least two of these elements. Particularly, the nonmagnetic intermediate layer 12b preferably comprises Ru.

Each of the first and second pinned magnetic layers 12a and 12c is formed to a thickness of about 10 Å to 70 Å. The nonmagnetic intermediate layer 12b is formed to a thickness of about 3 Å to 10 Å.

The pinned magnetic layer 12 may be formed in a single layer structure comprising any of the above-described magnetic materials, or a two-layer structure comprising a layer of any of the magnetic materials and an anti-diffusion layer such as a Co layer or the like.

The nonmagnetic material layer 13 is a layer for preventing magnetic coupling between the pinned magnetic layer 12 and the free magnetic layer 14. For the multilayer film T1 serving as the GMR element, the nonmagnetic material layer 13 comprises a nonmagnetic conductive material such as Cu, Cr, Au, Ag, or the like, and preferably Cu. For the multilayer film T1 serving as the TMR element, the nonmagnetic material layer 12 comprises an insulating material such as $Al_2O_3$, or the like. The nonmagnetic material layer 13 is formed to a thickness of, for example, about 1 Å to 30 Å.

Each of the first and second free magnetic layers 14c and 14a comprises a ferromagnetic material, for example, a NiFe alloy, Co, a CoFeNi alloy, a CoFe alloy, a CoNi alloy, or the like, and particularly, a NiFe alloy, a CoFe alloy or a CoFeNi alloy is preferably used.

The nonmagnetic intermediate layer 14b comprises a nonmagnetic material, for example, at least one of Ru, Rh, Ir, Cr, Re, and Cu, or an alloy of at least two of these elements. Particularly, the nonmagnetic intermediate layer 14b preferably comprises Ru.

Each of the first and second free magnetic layers 14c and 14a is formed to a thickness of about 10 Å to 70 Å. The nonmagnetic intermediate layer 14b is formed to a thickness of about 3 Å to 10 Å.

The second free magnetic layer 14a is preferably formed in a two-layer structure comprising a Co film formed on the side facing the nonmagnetic material layer 13. This can prevent diffusion of a metal element at the interface with the nonmagnetic material layer 13 to increase the rate of change in resistance (ΔR/R).

The free magnetic layer 14 may be formed in a single-layer structure comprising any of the above-described magnetic materials.

The free magnetic layer 14 comprises the second free magnetic layer 14a and the first free magnetic layer 14c which have different magnetic thicknesses (Ms×t; product of saturation magnetization and thickness) and laminated with the nonmagnetic intermediate layer 14b and which are provided therebetween. The free magnetic layer 14 is in a ferrimagnetic state in which the magnetization directions of the second and first free magnetic layers 14a and 14c are antiparallel to each other. In this case, the magnetization direction of one of the free magnetic layers, which has a larger magnetic thickness (Ms×t), for example, the second free magnetic layer 14a, is oriented in the direction (the X direction shown in the drawing) of a magnetic field produced from the hard bias layers, and the magnetization direction of the first free magnetic layer 14c is oriented in the direction (antiparallel to the X direction) 180° opposite to that of the second free magnetic layer 14a.

The direction of the synthetic magnetic thickness (Ms×t) obtained by adding the magnetic thickness (Ms×t) of the second free magnetic layer 14a to the magnetic thickness (Ms×t) of the first free magnetic layer 14c is the magnetization direction of the free magnetic layer 14.

The magnetization direction of the free magnetic layer 14 is parallel to the surface facing the recording medium.

The magnetic domain control layer 18 is formed in front of the multilayer film T1 near the surface facing the recording medium, and the magnetic domain control layer 19 is formed behind the multilayer film T1 in the height direction. In FIG. 2, the magnetic domain control layer 18 is in contact with the front end surface T1a of the multilayer film T1, and the magnetic domain control layer 19 is in contact with the rear end surface T1b of the multilayer film t1.

The magnetic domain control layer 18 comprises an antiferromagnetic material or hard magnetic material. As the antiferromagnetic material, the same antiferromagnetic material as that for forming the antiferromagnetic layer 11, i.e., the PtMn alloy, the X—Mn alloy or the Pt—Mn—X' alloy, is preferably used. As the hard magnetic material, a CoPt alloy, a CoCrPt alloy, a CoCrPtTa alloy, or a CoCrTa alloy can be used.

The thickness of each of the magnetic domain control layers 18 and 19 is 80 Å to 300 Å.

As shown in FIG. 2, ferromagnetic layers 25 and 28 are laminated on the magnetic domain control layers 18 and 19 with nonmagnetic intermediate layers 24 and 27, respectively. The magnetic flux guide layer 17 is laminated on the ferromagnetic layers 25 and 28 with nonmagnetic intermediate layers 26 and 29, respectively.

The magnetic flux guide layer 17 is laminated over the ferromagnetic layer 25, the free magnetic layer 14 and the ferromagnetic layer 28 to extend from the surface F facing the recording medium.

Each of the ferromagnetic layers 25 and 28 comprises a CoFe alloy, a NiFe alloy or a CoFeNi alloy. The thickness of each of the ferromagnetic layers 25 and 28 is preferably 10 Å to 30 Å.

The nonmagnetic intermediate layer 24 interposed between the magnetic domain control layer 18 and the ferromagnetic layer 25, and the nonmagnetic intermediate layer 27 interposed between the magnetic domain control layer 19 and the ferromagnetic layer 28 are made of Cu, Ag, Au, Cr, Pt, Pd, Ru, Rh, or Re. The thickness of each of the nonmagnetic intermediate layers 24 and 27 is preferably 3 Å to 30 Å.

The presence of the nonmagnetic intermediate layers 24 and 27 permits control of the magnitudes of the exchange coupling magnetic fields or bias magnetic fields between the magnetic domain control layer 18 and the ferromagnetic layer 25 and between the magnetic domain control layer 19 and the ferromagnetic layer 28. As a result, magnetization of the magnetic flux guide layer 17 can be appropriately easily changed with the external magnetic field (the leakage magnetic field from the recording medium) while the magnetic flux guide layer 17 is put into a single magnetic domain state. Therefore, the magnetization direction of the free magnetic layer 14 changes with high sensitivity to a change in the external magnetic field to improve magnetic field detectivity.

The nonmagnetic intermediate layers 26 and 29 between the magnetic flux guide layer 17 and the ferromagnetic layers 25 and 28, respectively, also have the function to control the magnitudes of interlayer coupling magnetic fields between the magnetic flux guide layer 17 and the ferromagnetic layers 25 and 28, respectively. Each of the nonmagnetic intermediate layers 26 and 29 also functions as an anti-oxidation layer in the process for manufacturing the magnetic head. Each of the nonmagnetic intermediate layers 26 and 29 preferably comprises at least one noble metal of Ru, Re, Pd, Os, Ir, Pt, Au, Rh, and Cu, or Cr.

These materials are less oxidized in the thickness direction, and thus exhibit a sufficient anti-oxidation effect even when the nonmagnetic intermediate layers are thin. Therefore, even if oxide layers are formed on the surfaces of the nonmagnetic intermediate layers 26 and 29 in the process for manufacturing the magnetic head, the oxide layers can be removed by low-energy ion milling to prevent deterioration in the ferromagnetic properties of the-ferromagnetic layers 25 and 28 below the nonmagnetic intermediate layers 26 and 29, respectively.

Also, the nonmagnetic layer 23 formed on the free magnetic layer 14 preferably comprises at least one noble metal of Ru, Re, Pd, Os, Ir, Pt, Au, Rh, and Cu, or Cr. The nonmagnetic layer 23 also has the function to control the magnitude of an interlayer coupling magnetic field between the free magnetic layer 14 and the magnetic flux guide layer 17 and an anti-oxidation function.

When the thickness of each of the nonmagnetic intermediate layers 26 and 29 is 0.5 Å to 6 Å, the magnetization directions of the ferromagnetic layers 25 and 28 are parallel to the magnetization direction of the magnetic flux guide layer 17. When the thickness of each of the nonmagnetic intermediate layers 26 and 29 is 6 Å to 11 Å, the magnetization directions of the ferromagnetic layers 25 and 28 are antiparallel to the magnetization direction of the magnetic flux guide layer 17. In order to increase magnetic-field detection output, the magnetization directions of the ferromagnetic layers 25 and 28 are preferably parallel to the magnetization direction of the magnetic flux guide layer 17. On the other hand, in order to prevent disturbance of the magnetization direction due to demagnetizing fields at the ends of the magnetic flux guide layer 17 in the track width direction, the magnetization directions of the ferromagnetic layers 25 and 28 are preferably antiparallel to the magnetization direction of the magnetic flux guide layer 17.

When the thickness of the nonmagnetic layer 23 is 0.5 Å to 6 Å, the magnetization direction the free magnetic layer 14 is parallel to the magnetization direction of the magnetic flux guide layer 17, while when the thickness of the nonmagnetic layer 23 is 6 Å to 11 Å, the magnetization direction the free magnetic layer 14 is antiparallel to the magnetization direction of the magnetic flux guide layer 17. In order to increase the magnetic-field detection output, the magnetization direction the free magnetic layer 14 is preferably antiparallel to the magnetization direction of the magnetic flux guide layer 17.

However, the magnetic flux guide layer 17 may be laminated directly on the free magnetic layer 14 and the ferromagnetic layers 25 and 28 without the nonmagnetic layer 23 and the nonmagnetic intermediate layers 26 and 29.

Figure 3:
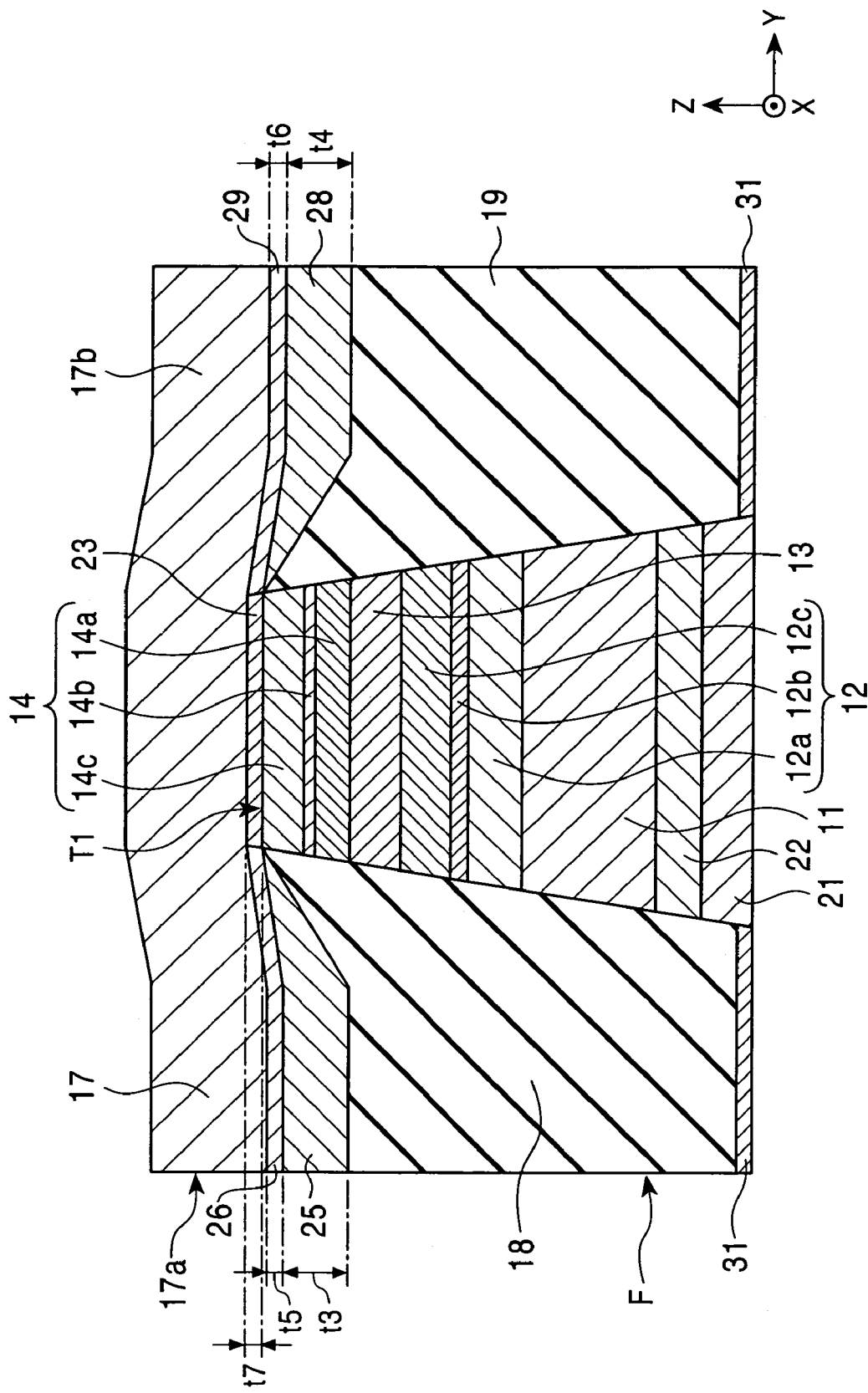
FIG. 3 is a longitudinal sectional view showing a magnetic head according to a second embodiment of the present invention.

As shown in FIG. 3, the nonmagnetic intermediate layer 24 interposed between the magnetic domain control layer 18 and the ferromagnetic layer 25 and the nonmagnetic intermediate layer 27 interposed between the magnetic domain control layer 19 and the ferromagnetic layer 28 need not be formed. When the nonmagnetic intermediate layers 24 and 27 are not formed, the exchange coupling magnetic field or ferromagnetic coupling with the magnetic domain control layers 18 and 19 must be controlled by appropriately selecting the materials and thicknesses of the ferromagnetic layers 25 and 28 so that magnetization of the magnetic flux guide layer 17 is appropriately changed with the external magnetic field (leakage magnetic field from the recording medium) while the magnetic flux guide layer 17 is put into the single magnetic domain state.

In order to decrease the exchange coupling magnetic field between the magnetic domain control layer 18 and the ferromagnetic layer 25 and the exchange coupling magnetic field between the magnetic domain control layer 19 and the ferromagnetic layer 28, for example, the ferromagnetic layers 25 and 28 may comprise NiFe or NiFeNb. It is also effective that the magnetic flux guide layer 17 comprises NiFeNb, a Fe—Zr—O alloy, or an amorphous CoNbZr alloy.

Figure 4:
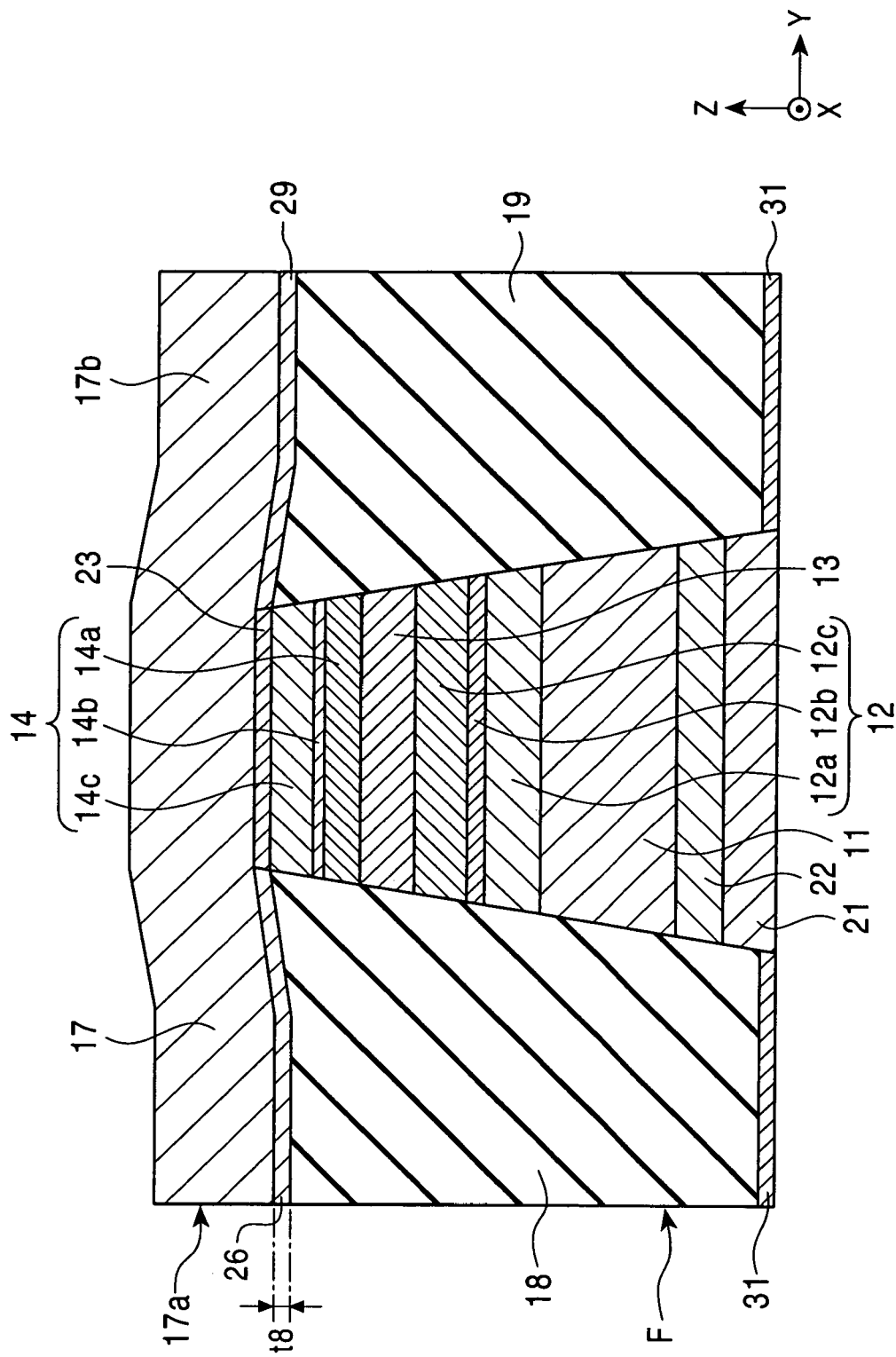
FIG. 4 is a longitudinal sectional view showing a magnetic head according to a third embodiment of the present invention.

FIG. 4 is a longitudinal sectional view of a magnetic head according to a third embodiment of the present invention taken along a plane perpendicular to the surface facing the recording medium.

The magnetic head shown in FIG. 4 is different from the magnetic head shown in FIG. 2 in that nonmagnetic intermediate layers 26 and 29 are laminated directly on magnetic domain control layers 18 and 19, and a magnetic flux guide layer 17 is formed on a nonmagnetic layer 23 and the nonmagnetic intermediate layers 26 and 29.

Even in the magnetic head comprising the magnetic domain control layers 18 and 19 each comprising an antiferromagnetic material such as the PtMn alloy, the X—Mn alloy or the Pt—Mn—X' alloy, and the ferromagnetic layers 25 and 28 shown in FIGS. 1 and 2 are not formed, the presence of the nonmagnetic intermediate layers 26 and 29 permits the supply of an appropriately weak bias magnetic field to the magnetic flux guide layer 17.

Each of the nonmagnetic intermediate layers 26 and 29 is formed to a thickness t8 of 0.2 Å to 30 Å. In the regions where the nonmagnetic intermediate layers 26 and 29 overlap with the magnetic domain control layers 18 and 19, respectively, exchange coupling is transmitted to the magnetic flux guide layer 17 through the nonmagnetic intermediate layers 26 and 29, or the magnetic flux guide layer 17 is exchange-coupled directly with the magnetic domain control layers 18 and 19 through pin holes formed in the nonmagnetic intermediate layers 26 and 29.

As a result, an exchange coupling magnetic field occurs between the magnetic flux guide layer 17 and each of the magnetic domain control layers 18 and 19 which overlap with the magnetic flux guide layer 17, thereby aligning the magnetization direction of the magnetic flux guide layer 17 in the track width direction.

The thickness of each of the magnetic domain control layers 18 and 19 is preferably 80 Å to 300 Å.

Therefore, each of the magnetic domain control layers 18 and 19 appropriately possesses antiferromagnetism.

The magnetic flux guide layer 17 may be laminated directly on the first free magnetic layer 14c and the magnetic domain control layers 18 and 19 without the nonmagnetic layer 23 and the nonmagnetic intermediate layers 26 and 29.

In the magnetic head shown in FIG. 4, when each of the magnetic domain control layers 18 and 19 comprises a hard magnetic material, the magnetic flux guide layer 17 may be laminated on the magnetic domain control layers 18 and 19 directly or through only the nonmagnetic intermediate layers 26 and 29.

Figure 5:
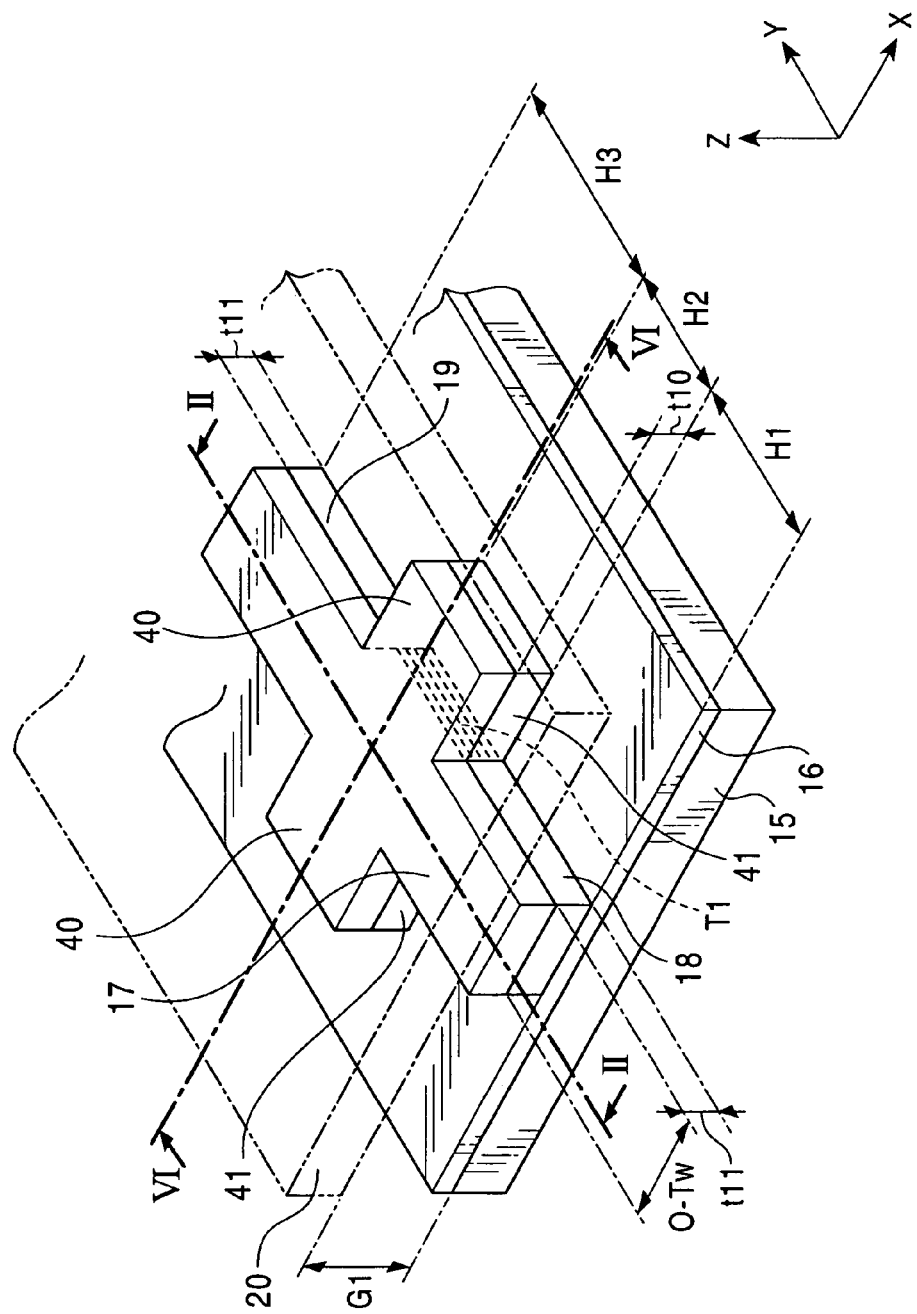
FIG. 5 is a schematic partial perspective view showing a magnetic head according to a fourth embodiment of the present invention.

FIG. 5 is a perspective view schematically showing a magnetic head according to a fourth embodiment of the present invention.

Like in the magnetic head shown in FIG. 1, in the magnetic head shown in FIG. 5, a multilayer film T1 comprising an antiferromagnetic layer 11, a pinned magnetic layer 12, a nonmagnetic material layer 13, and a free magnetic layer 14 is formed on a lower gap layer 16 laminated on a lower shield layer 15 to be disposed at a predetermined distance H1 from a surface F facing a recording medium in the height direction.

Also, a magnetic flux guide layer 17 is connected to the top of the free magnetic layer 14 of the multilayer film (magnetic detecting element) T1.

Furthermore, an upper shield layer 20 is laminated on the magnetic flux guide layer 17 with an upper gap layer (not shown in the drawing) provided therebetween and comprising a nonmagnetic material.

The magnetic head shown in FIG. 5 is different from the magnetic head shown in FIG. 1 in that longitudinal bias layers 41 are formed on both sides of the multilayer film T1 in the track width direction, and tab layers 40 are formed on the longitudinal bias layers 41 integrally with the magnetic flux guide layer 17 to extend in the track width direction.

Like the magnetic flux guide layer 17, each of the tab layers 40 is made of a ferromagnetic material selected from a CoFe alloy, a NiFe alloy, a CoFeNi alloy, and Co. However, NiFeNb is preferably not used for the tab layers 40 because a magnetization pinning force can be strengthened.

The longitudinal bas layers 41 are made of an antiferromagnetic material or hard magnetic material, and preferably made of the same material as that of the magnetic domain control layers 18 and 19.

Therefore, the PtMn alloy, the X—Mn alloy or the Pt—Mn—X' alloy is preferably used as the antiferromagnetic material, and a CoPt alloy, a CoCrPt alloy, a CoCrPtTa alloy or a CoCrTa alloy is preferably used as the hard magnetic material.

The magnetization directions of the tab layers 40 are aligned in the track width direction or a direction antiparallel to the track width direction by exchange coupling magnetic fields or ferromagnetic coupling magnetic fields between the tab layers 40 and the longitudinal bias layers 41.

The tab layers 40 are magnetically coupled with the free magnetic layer 14 through the magnetic flux guide layer 17. As a result, the single magnetic domain structure of the free magnetic layer 14 in which magnetization is aligned in the track width direction (the X direction shown in the drawing) or a direction antiparallel to the track width direction can be stabilized.

Although not shown in FIG. 5, a nonmagnetic intermediate layer and ferromagnetic layer are interposed between the longitudinal bias layers 41 and the magnetic flux guide layer 17. These layers will be described below.

In this embodiment, the longitudinal bias layers 41 are formed in the spaces on both sides of the multilayer film T1 in the track width direction below the magnetic flux guide layer 17. Therefore, the shape of the tab layers 40 can be flattened to improve the magnetization pinning force.

Also the tab layers 40 are laminated on the longitudinal bias layers 41, for controlling magnetizations of the tab layers 40. Therefore, the longitudinal bias layers 41 can be formed in substantially flat thin film, thereby stabilizing the bias magnetic fields supplied to the tab layers 40.

Since the longitudinal bias layers 41 are formed in the spaces on both sides of the multilayer film T1 in the track width direction, even when the longitudinal bias layers 41 are formed, an increase in the total thickness dimension of the magnetic head can be suppressed. Namely, the gap length G1 of the magnetic head can be easily maintained short. The gap length G1 of the magnetic head is defined by the distance between the lower shield layer 15 and the upper shield layer 20 at the surface facing the recording medium.

In the magnetic head shown in FIG. 5, the thickness t11 of the magnetic domain control layers 18 and 19 can be set to be equal to the thickness t10 of the longitudinal bias layers 41, and thus the magnetic flux guide layer 17 and the tab layers 40 can be flattened to permit the supply of a stable longitudinal bias magnetic field to the free magnetic layer 14.

Figure 6:
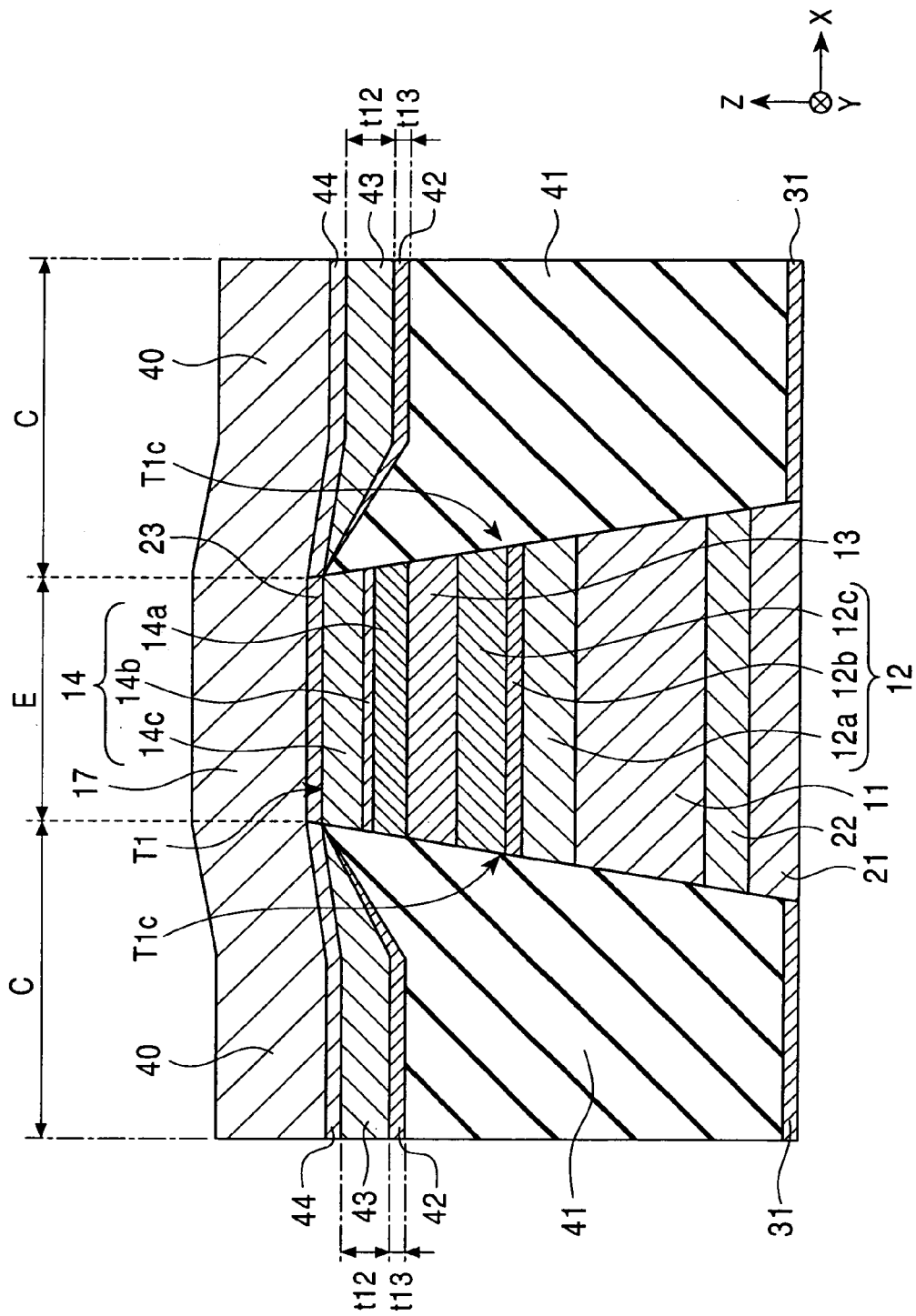
FIG. 6 is a sectional view showing the magnetic head shown in FIG. 5 taken along line VI—VI, as viewed from an arrow direction.

FIG. 6 is a sectional view of the magnetic head of the fourth embodiment of the present invention shown in FIG. 5 taken along a one-dot chain line VI—VI in FIG. 5, as viewed from an arrow direction. Namely, FIG. 6 is a sectional view as viewed from the surface facing the recording medium. In FIG. 6, the lower shield layer 15, the lower gap layer 16 and the upper shield layer 20 are not shown.

The structure of the multilayer film T1 is the same as that of the multilayer film T1 shown in FIG. 2, and thus the description thereof is omitted.

As shown in FIG. 6, the longitudinal bias layers 41 are formed on both sides of the multilayer film T1 in the track width direction. In FIG. 6, the longitudinal bias layers 41 are in contact with both end surfaces T1c of the multilayer film T1.

As shown in FIG. 6, ferromagnetic layers 43 are laminated on the respective longitudinal bias layers 41 with nonmagnetic intermediate layers 42 provided therebetween.

Also, the tab layers 40 are laminated on the respective ferromagnetic layers 43 with nonmagnetic intermediate layers 44 provided therebetween. The tab layers 40 comprise a ferromagnetic material and are formed integrally with the magnetic flux guide layer 17 on the multilayer film T1. Namely, in a layer comprising a ferromagnetic material and extending in the track width direction, the central portion E overlapping with the multilayer film T1 is referred to as the "magnetic flux guide layer 17", and both sides C overlapping with the longitudinal bias layers 41 are referred to as the "tab layers 40".

The ferromagnetic layers 43 are made of a CoFe alloy, a NiFe alloy or a CoFeNi alloy. The thickness t12 of the ferromagnetic layers 43 is preferably 10 Å to 30 Å.

The nonmagnetic intermediate layers 42 interposed between the longitudinal bias layers 41 and the ferromagnetic layers 43 are made of Cu, Ag, Au, Cr, Pt, Pd, Ru, Re, or Rh. The thickness t13 of the nonmagnetic intermediate layers 42 is preferably 0.5 Å to 30 Å.

The presence of the nonmagnetic intermediate layers 42 permits control of the magnitudes of the exchange coupling magnetic fields or bias magnetic fields between the longitudinal bias layers 41 and the ferromagnetic layers 43. As a result, magnetization of the magnetic flux guide layer 17 can be appropriately easily changed with the external magnetic field (the leakage magnetic field from-the recording medium) while the magnetic flux guide layer 17 is put into a single magnetic domain state through the tab layers 40. Therefore, the magnetization direction of the free magnetic layer 14 changes with high sensitivity to a change in the external magnetic field to improve magnetic field detectivity.

The nonmagnetic intermediate layers 44 between the ferromagnetic layers 43 and the tab layer 40 also have the function to control the magnitudes of interlayer coupling magnetic fields between the ferromagnetic layers 43 and the tab layers 40. Each of the nonmagnetic intermediate layers 44 also functions as an anti-oxidation layer in the process for manufacturing the magnetic head. The nonmagnetic intermediate layers 44 are preferably made of at least one noble metal of Ru, Re, Pd, Os, Ir, Pt, Au, Rh, and Cu, or Cr.

These materials are less oxidized in the thickness direction, and thus exhibit a sufficient anti-oxidation effect even when the nonmagnetic intermediate layers are thin. Therefore, even if oxide layers are formed on the surfaces of the nonmagnetic intermediate layers 44 in the process for manufacturing the magnetic head, the oxide layers can be removed by low-energy ion milling to prevent deterioration in the ferromagnetic properties of the ferromagnetic layers 43 below the nonmagnetic intermediate layers 44.

Also, as described above, the nonmagnetic layer 23 formed on the free magnetic layer 14 is preferably made of at least one noble metal of Ru, Re, Pd, Os, Ir, Pt, Au, Rh, and Cu, or Cr.

When the thickness of each of the nonmagnetic intermediate layers 44 is 0.5 Å to 6 Å, the magnetization directions of the ferromagnetic layers 43 are parallel to the magnetization directions of the tab layers 40. When the thickness of each of the nonmagnetic intermediate layers 44 is 6 Å to 11 Å, the magnetization directions of the ferromagnetic layers 43 are antiparallel to the magnetization directions of the tab layers 40. In order to increase the magnetic-field detection output, the magnetization directions of the ferromagnetic layers 43 are preferably antiparallel to the magnetization directions of the tab layers 40, and the magnetization direction of the free magnetic layer 14 is preferably parallel to the magnetization direction of the magnetic flux guide layer 17.

When the thickness of the nonmagnetic layer 23 is 0.5 Å to 6 Å, the magnetization direction the free magnetic layer 14 is parallel to the magnetization direction of the magnetic flux guide layer 17, while when the thickness of the non- magnetic layer 23 is 6 Å to 11 Å, the magnetization direction of the free magnetic layer 14 is antiparallel to the magnetization direction of the magnetic flux guide layer 17. In order to increase the magnetic-field detection output, the magnetization directions of the ferromagnetic layers 43 may be parallel to the magnetization directions of the tab layers 40, and the magnetization direction the free magnetic layer 14 may be antiparallel to the magnetization direction of the magnetic flux guide layer 17.

However, in the present invention, the magnetic flux guide layer 17 or the tab layers 40 may be laminated directly on the free magnetic layer 14 and the ferromagnetic layers 43 without the nonmagnetic layer 23 and the nonmagnetic intermediate layers 44.

The nonmagnetic intermediate layers 42 interposed between the longitudinal bias layers 41 and the ferromagnetic layers 43 are preferably not formed. In the overlap regions between the tab layers 40 and the longitudinal bias layers 41, a signal magnetic flux from the recording medium is not transmitted, and thus, unlike in the overlap region between the magnetic flux guide layer 17 and the magnetic domain control layer 18, the exchange coupling magnetic field need not be appropriately weakened.

When the longitudinal bias layers 41 and the tab layers 40 are formed on both sides of the multilayer film T1 in the track width direction, the ferromagnetic layers 43 may be omitted, and the nonmagnetic intermediate layers 44 may be laminated directly oh the longitudinal bias layers 41. The magnetic flux guide layer 17 and the tab layers 40 may be formed on the nonmagnetic intermediate layers 44.

In the present invention, the longitudinal bias layers 41 are not limited to the above-described construction.

Figure 7:
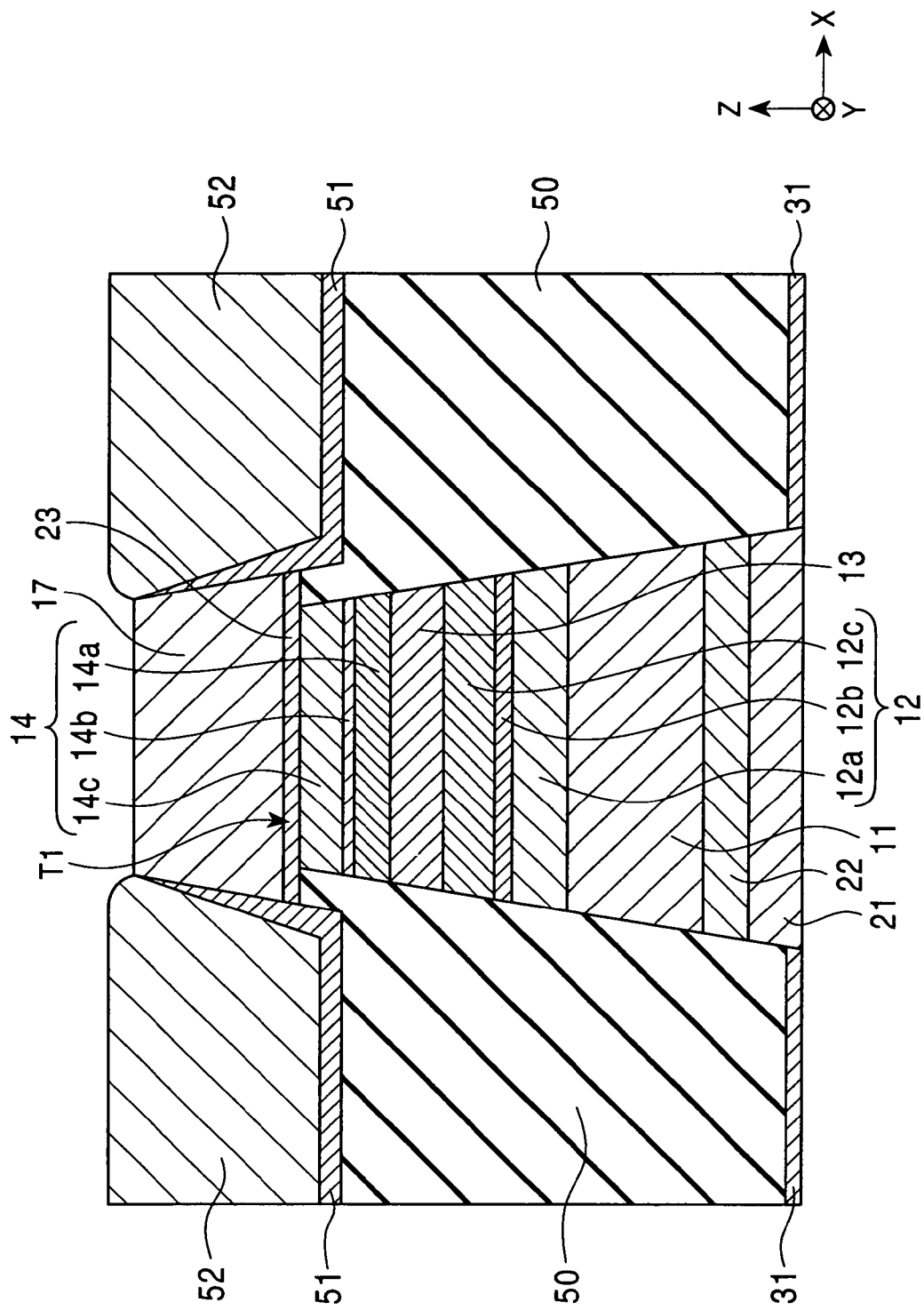
FIG. 7 is a sectional view showing a magnetic head according to a fifth embodiment of the present invention.

For example, as shown in FIG. 7, both sides of the multilayer film T1 in the track width direction may be filled with insulating layers 50 made of alumina or $SiO_2$, and hard bias layers 52 may be formed on the respective insulating layers 50 with bias underlying layers 51 provided therebetween so as to be adjacent to both side ends of the magnetic flux guide layer 17 in the track width direction. The hard bias layers 52 are made of a hard magnetic material such as CoPt, or the like.

Figure 8:
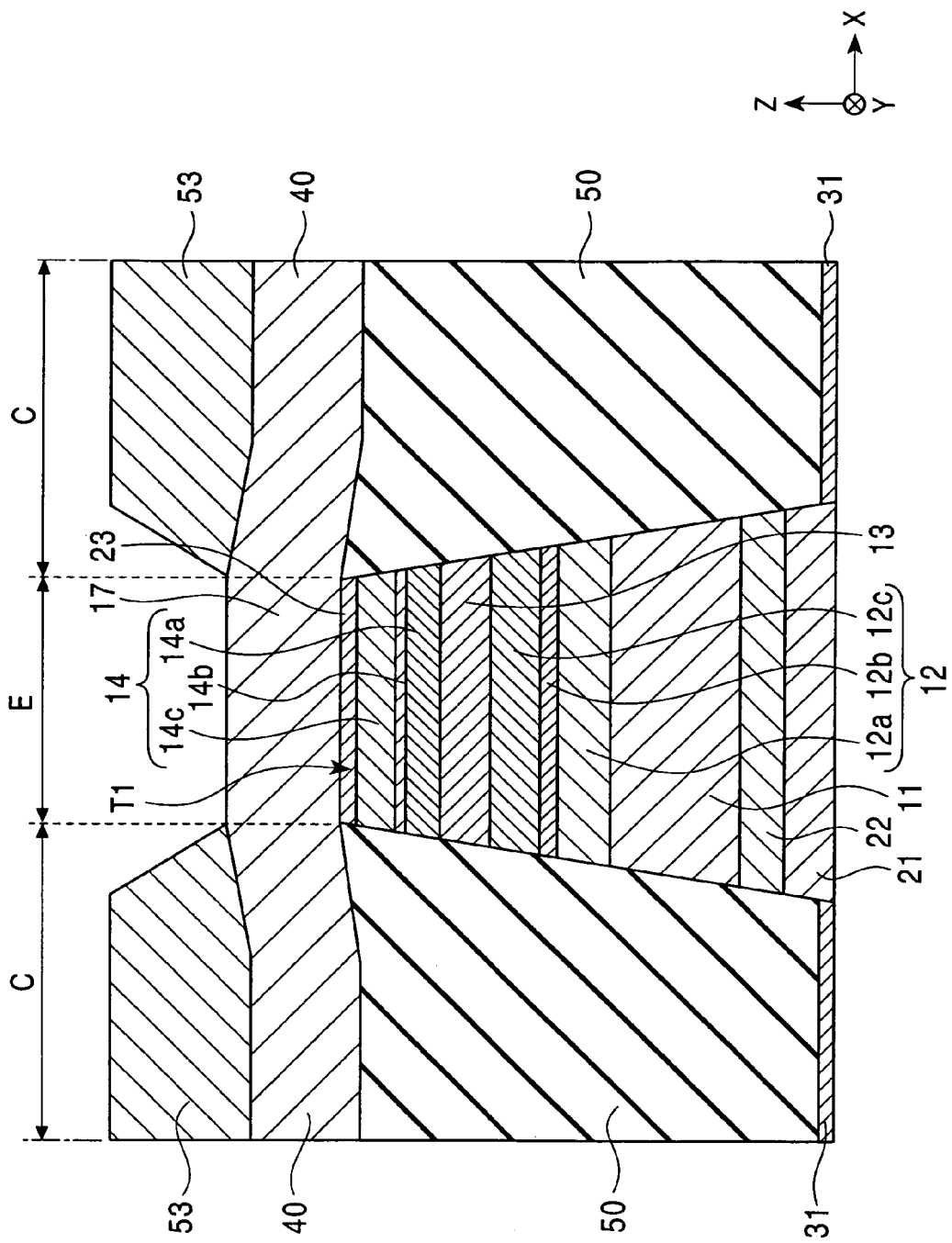
FIG. 8 is a sectional view showing a magnetic head according to a sixth embodiment of the present invention.

Alternatively, as shown in FIG. 8, both sides of the multilayer film T1 in the track width direction may be filled with insulating layers 50 made of alumina or $SiO_2$, and the tab layer 40 may be laminated directly on the insulating layers 50 integrally with the magnetic flux guide layer 17. Also, a pair of antiferromagnetic layers 53 may be formed on the tab layers 40 to be spaced in the track width direction. The material of the antiferromagnetic layers 53 is the same as that of the antiferromagnetic layer 11 and the magnetic domain control layers 18 and 19.

The method of manufacturing the magnetic head shown in FIGS. 1 and 2 will be described below.

Each of FIGS. 9 to 12 is a longitudinal sectional view of the magnetic head shown in FIG. 1 in a manufacturing step taken along the same direction as in FIG. 2. In the step shown in FIG. 9, the underlying layer 21, the seed layer 22, the antiferromagnetic layer 11, the pinned magnetic layer 12, the nonmagnetic intermediate layer 13, the free magnetic layer 14 and the nonmagnetic layer 23 are continuously deposited on, for example, the lower gap layer (not shown in FIG. 9) to form a multilayer film T in the shape of a solid film. In the deposition step, sputtering or vapor deposition is used.

The material and thickness of each of the underlying layer 21, the seed layer 22, the antiferromagnetic layer 11, the pinned magnetic layer 12, the nonmagnetic material layer 13, the free magnetic layer 14 and the nonmagnetic layer 23 are the same as those of each layer of the multilayer film T1 shown in FIG. 2, and thus description is omitted.

The nonmagnetic layer 23 functions as a protective layer provided for preventing oxidation of the free magnetic layer 14 due to air exposure.

The nonmagnetic layer 23 is made of Cr or at least one noble metal of Ru, Re, Pd, Os, Ir, Pt, Au, Rh, and Cu, and formed to a thickness of as small as about 2 Å to 10 Å, and preferably about 2 Å to 5 Å.

These materials are less oxidized due to air exposure, or oxidation of the materials less proceeds in the thickness direction, as compared with a Ta film conventionally used as an anti-oxidation film.

Next, first magnetic-field annealing is performed. The multilayer film T is heat-treated at a first heat treatment temperature with a first magnetic field applied in a direction (the Y direction shown in the drawing) perpendicular to the track width direction (the X direction shown in the drawing) to produce an exchange coupling magnetic field between the antiferromagnetic layer 11 and the first pinned magnetic layer 12a constituting the pinned magnetic layer 12, so that the magnetization of the first pinned magnetic layer 12a is pinned in the Y direction. The magnetization of the second pinned magnetic layer 12c is pinned in the direction opposite to the Y direction by exchange coupling due to a RKKY interaction with the first pinned magnetic layer 12a. For example, the first heat treatment temperature is 270° C., and the magnitude of the magnetic field is 800 kA/m.

In the annealing, the constituent element of the nonmagnetic layer 23 diffuses into the first free magnetic layer 14c of the free magnetic layer 14. The diffusion of the constituent element of the nonmagnetic layer 23 can be measured by, for example, a SIMS analyzer, EDX analysis using a transmission electron microscope (TEM), or the like.

Next, a lift-off resist layer R1 is formed on the nonmagnetic layer 23.

Figure 9:
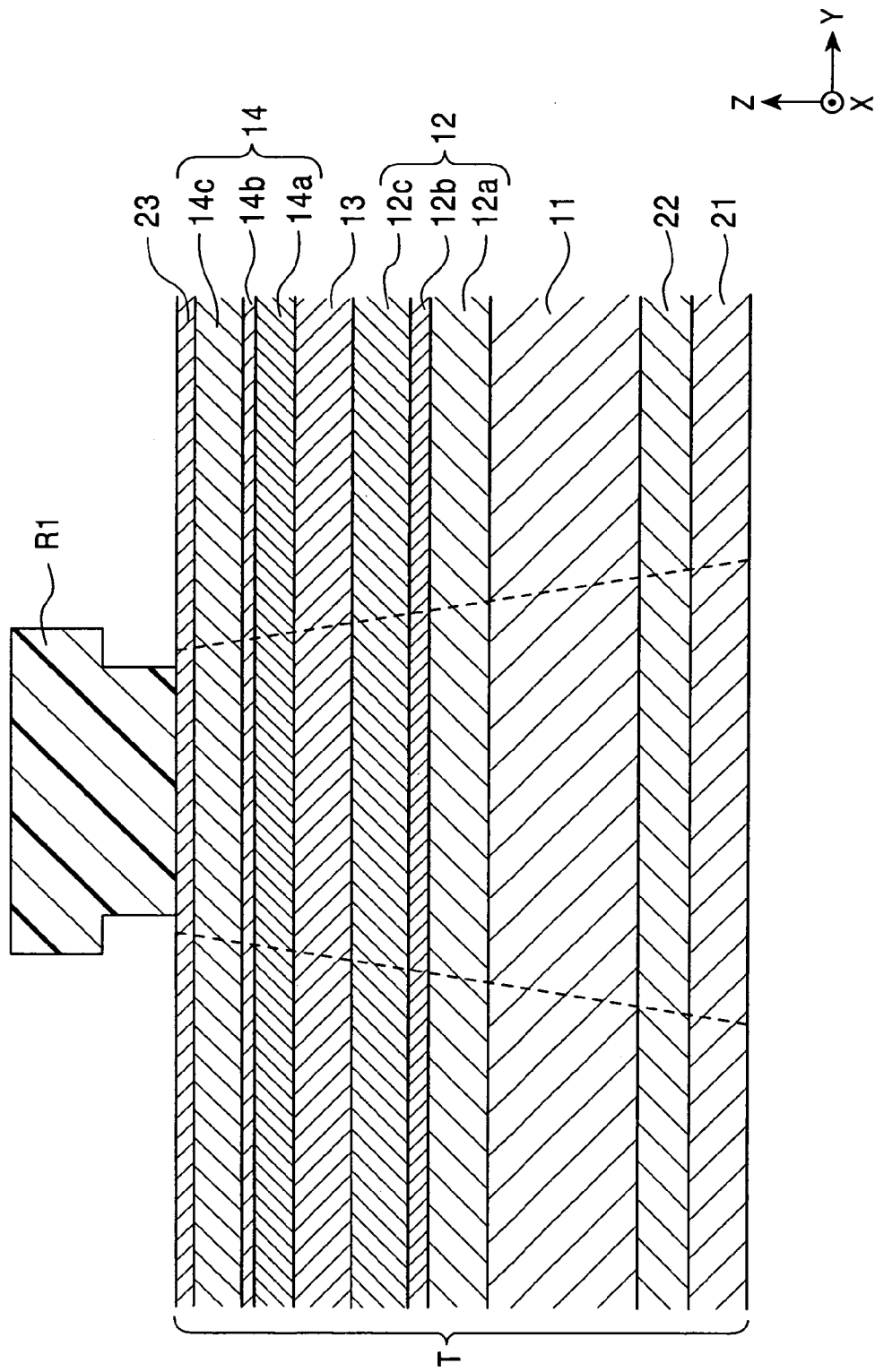
FIG. 9 is a longitudinal sectional view showing a step for manufacturing the magnetic head shown in FIGS. 1 and 2.
Figure 13:
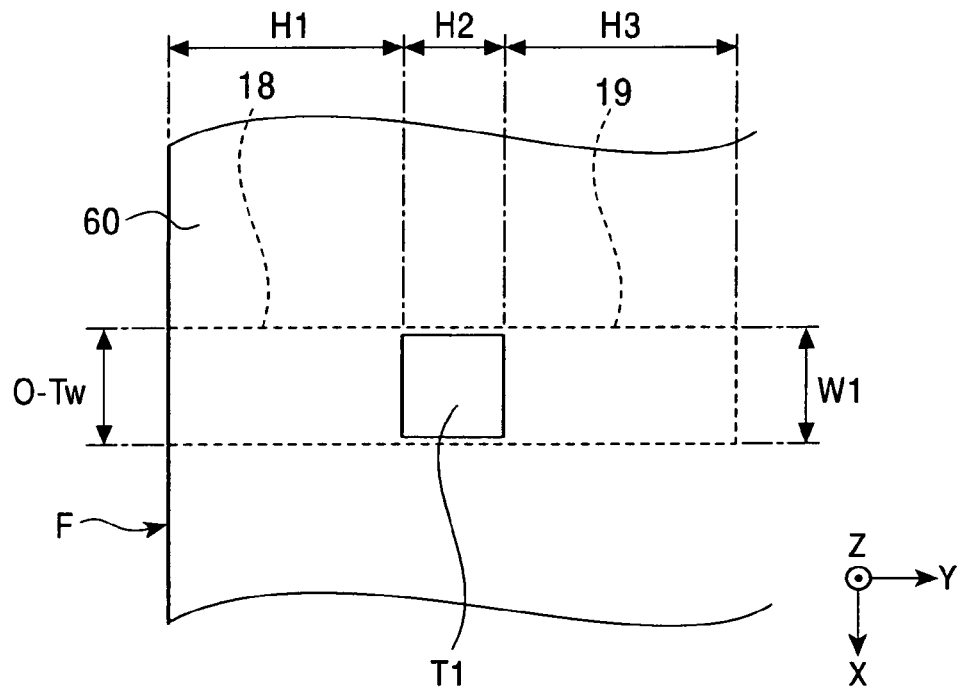
FIG. 13 is a plan view showing a step for manufacturing the magnetic head shown in FIGS. 1 and 2.

Then, a portion of the multilayer film T near the surface facing the recording medium and a rear portion in the height direction (the Y direction), both of which are not covered with the resist layer R1, are removed along dotted lines in FIG. 9 by ion milling or reactive ion etching (RIE). In this operation, both sides of the multilayer film T in the track width direction (the X direction) can be exposed and removed by ion milling or reactive ion etching (RIE). In the ion milling step, the multilayer film T1 having such a substantially square or rectangular planar shape as shown in FIG. 13 is formed. The length H2 of the multilayer film T1 in the height direction after the ion milling is equal to the length H2 of the multilayer film T1 of the completed magnetic head shown in FIG. 1 in the height direction.

The predetermined distance H1 from a surface turning to the surface F facing the recording medium in the height direction is preferably in the range of 0.03 µm to 0.2 µm. When the steps shown in FIGS. 9 to 13 are performed on a wafer, the surface F facing the recording medium does no appear in the manufacturing process. Therefore, the predetermined distance H1 is expressed by the distance from the surface turning to the surface F facing the recording medium to the multilayer film T1.

The length H2 of the multilayer film T1 in the height direction is preferably in the range of 0.05 µm to 0.2 µm, and the length W1 of the multilayer film T1 in the track width direction is equal to or slightly larger than the length of the magnetic flux guide layer 17 in the track width direction, the magnetic flux guide layer 17 being formed later. More specifically, the length W1 of the multilayer film T1 in the track width direction is preferably in the range of 0.06 µm to 0.2 µm, for example, with 100 Gb/in$^2$ or more, depending upon the recording format specifications such as the track density, the track pitch, and the like.

Figure 10:
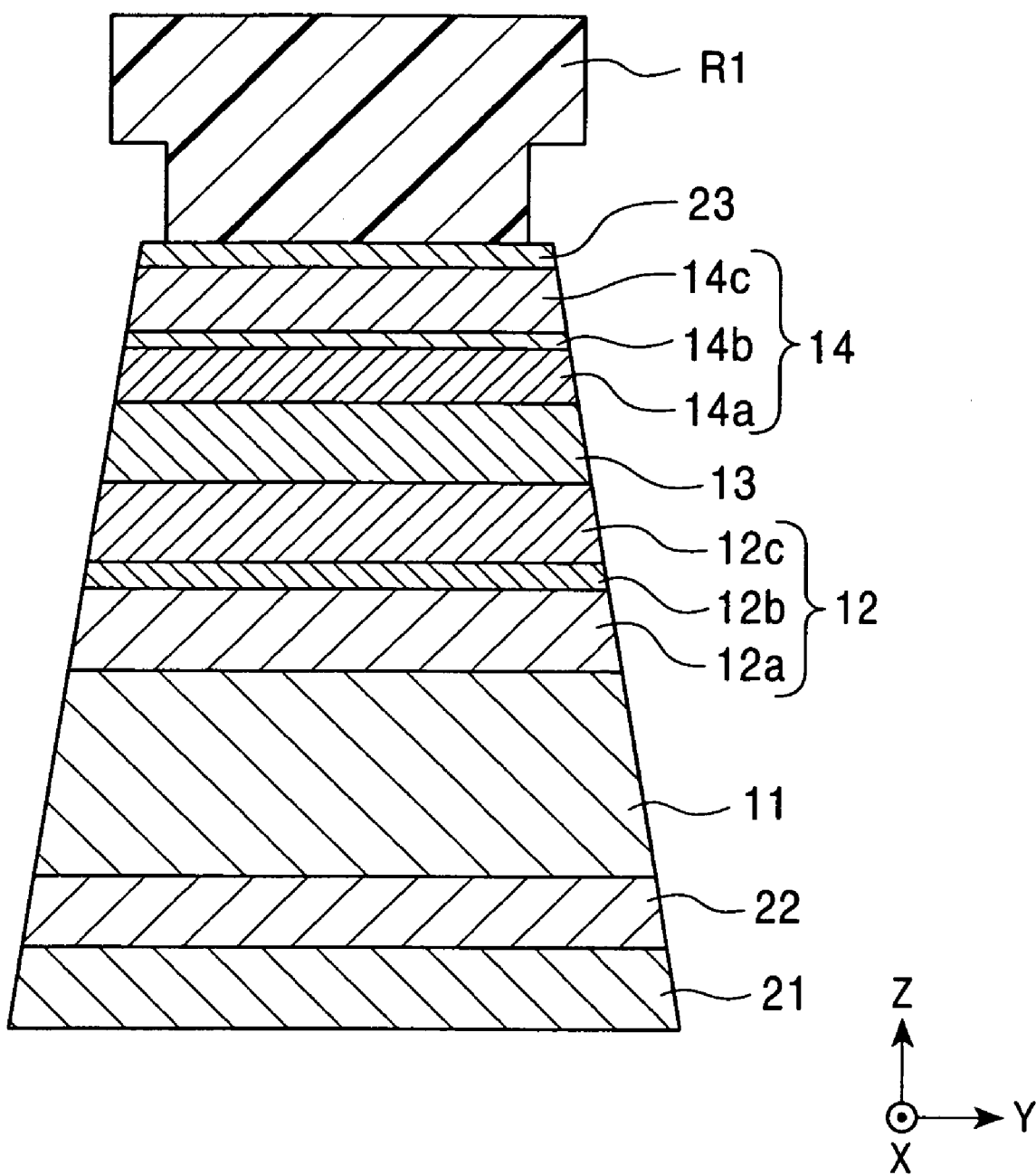
FIG. 10 is a longitudinal sectional view showing a step for manufacturing the magnetic head shown in FIGS. 1 and 2.

FIG. 10 is a longitudinal sectional view after the ion milling step.

Figure 11:
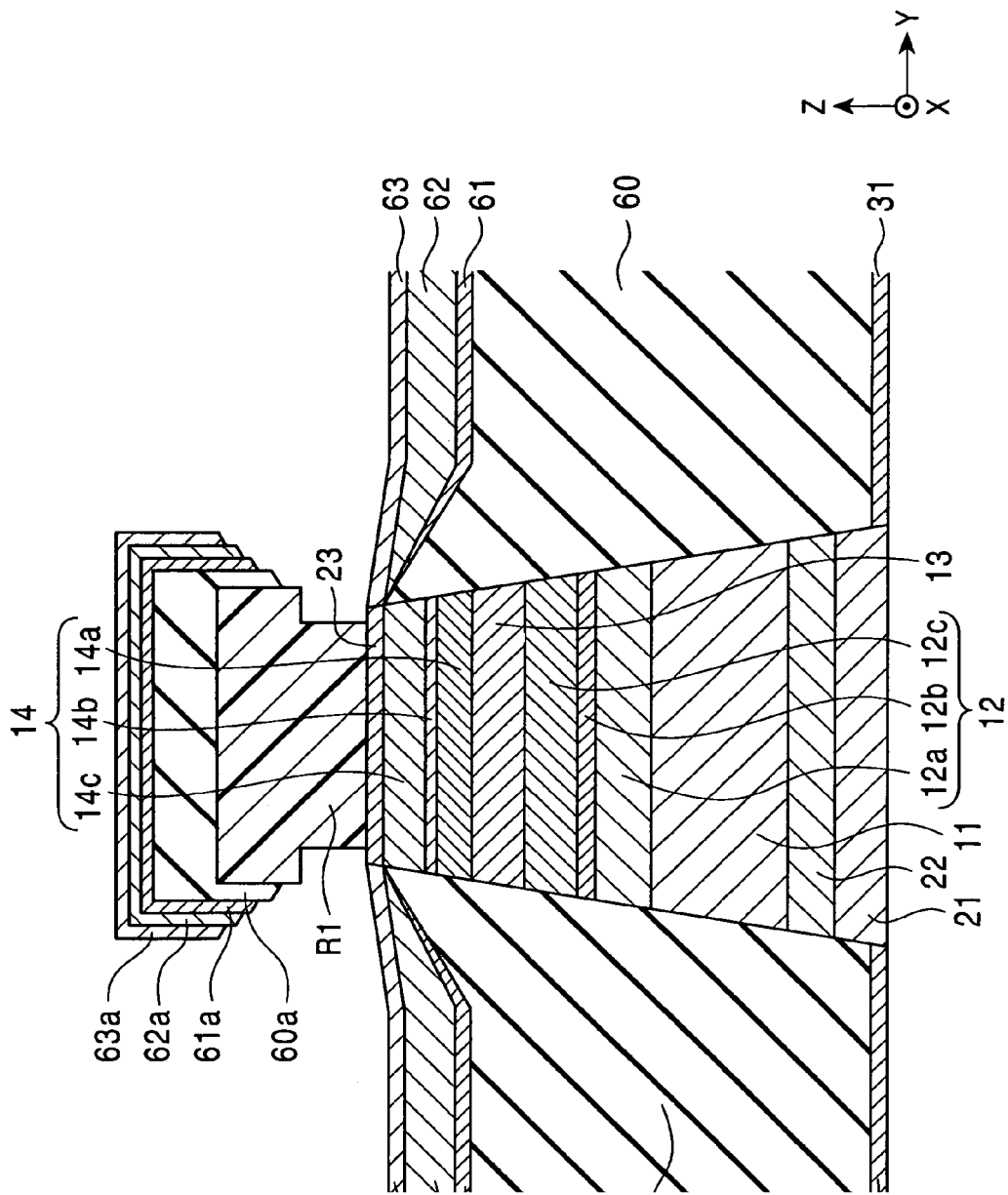
FIG. 11 is a longitudinal sectional view showing a step for manufacturing the magnetic head shown in FIGS. 1 and 2.

In the next step shown in FIG. 11, an antiferromagnetic material layer 60 is deposited around the multilayer film T1. FIG. 13 is a plan view showing the state in which the antiferromagnetic material layer 60 is deposited around the multilayer film T1. The antiferromagnetic material layer 60 is processed by resist photolithography and ion milling in a subsequent step to form the magnetic domain control layers 18 and 19.

The antiferromagnetic material layer 60 is preferably made of the same material as that of the antiferromagnetic layer 11. Specifically, the PtMn alloy, the X—Mn alloy or the Pt—Mn—X' alloy is preferred.

In forming the magnetic domain control layers 18 and 19 by using a hard magnetic material, a hard magnetic material layer comprising a CoPt alloy, a CoCrPt alloy, a CoCrPtTa alloy or a CoCrTa alloy is deposited instead of the antiferromagnetic material layer 60.

Furthermore, a nonmagnetic intermediate layer 61, a ferromagnetic layer 62 and a nonmagnetic intermediate layer 63 are continuously deposited on the antiferromagnetic material layer 60 around the multilayer film t1 in a vacuum state.

In this deposition, cover layers 60a, 61a, 62a and 63a comprising the same materials as those of the antiferromagnetic material layer 60, the nonmagnetic intermediate layer 61, the ferromagnetic layer 62 and the nonmagnetic intermediate layer 63, respectively, are laminated on the resist layer R1. However, the antiferromagnetic material layer 60, the nonmagnetic intermediate layer 61, the ferromagnetic layer 62 and the nonmagnetic intermediate layer 63 are not laminated on the nonmagnetic layer 23 of the multilayer film T1.

The nonmagnetic intermediate layer 61, the ferromagnetic layer 62 and the nonmagnetic intermediate layer 63 are processed by resist photolithography and ion milling in a subsequent step to form the nonmagnetic intermediate layers 24 and 27, the ferromagnetic layers 25 and 28, and the nonmagnetic intermediate layers 26 and 29, respectively. Therefore, the materials of the nonmagnetic intermediate layer 61, the ferromagnetic layer 62 and the nonmagnetic intermediate layer 63 are the same as the materials of the above-described nonmagnetic intermediate layers 24 and 27, ferromagnetic layers 25 and 28, and nonmagnetic intermediate layers 26 and 29, respectively. During deposition, the thicknesses of the nonmagnetic intermediate layer 61 and the ferromagnetic layer 62 are the same as those of the nonmagnetic intermediate layers 24 and 27 and the ferromagnetic layers 25 and 28, respectively, after the completion of the magnetic head. During deposition, the thickness of the nonmagnetic intermediate layer 63 is preferably 2 Å to 10 Å, and more preferably 2 Å to 5 Å.

Next, the resist layer R1 having the cover layers 60a, 61a, 62a, and 63a laminated thereon is removed. In the step shown in FIG. 12, oxide layers formed on the surfaces of the nonmagnetic layer 23 and the nonmagnetic intermediate layer 63 are removed by ion milling or reactive ion etching (RIE) of the surfaces. In this step, the nonmagnetic layer 23 and the nonmagnetic intermediate layer 63 may be completely removed or partially removed to leave portions having a thickness of 0.5 Å to 6 Å or 6 Å to 11 Å.

Figure 12:
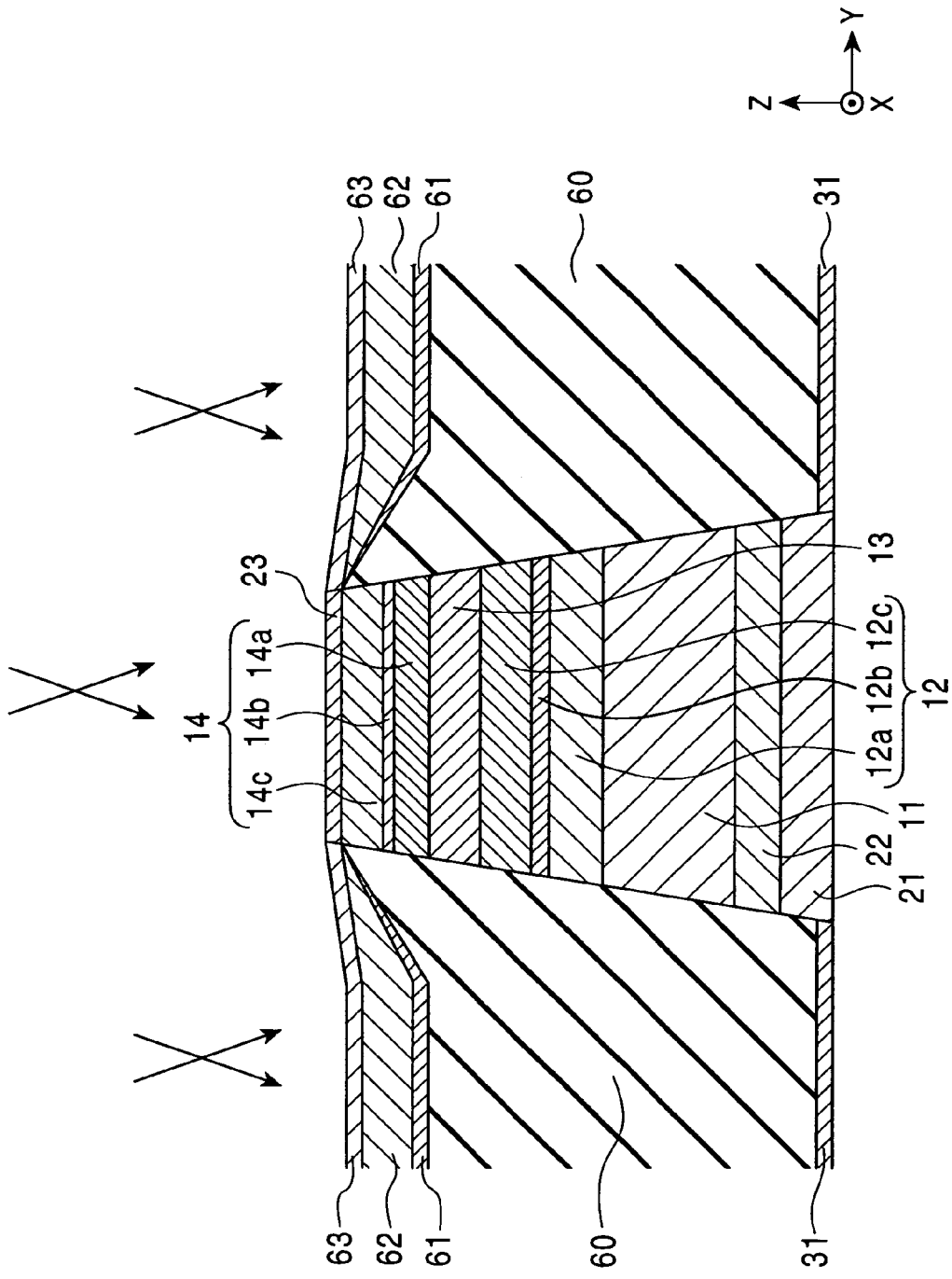
FIG. 12 is a longitudinal sectional view showing a step for manufacturing the magnetic head shown in FIGS. 1 and 2.

In the ion milling step shown in FIG. 12, low-energy ion milling can be performed. The reason for this is that the nonmagnetic layer 23 and the nonmagnetic intermediate layer 63 are formed to a thickness of as small as 2 Å to 10 Å, and preferably about 2 Å to 5 Å, and the thickness of the oxide layers formed on the surfaces of the nonmagnetic layer 23 and the nonmagnetic intermediate layer 63 is as small as about 3 Å to 6 Å.

Even with the above-described small thickness, the nonmagnetic layer 23 and the nonmagnetic intermediate layer 63 each made of Ru, Cr or Cu can sufficiently prevent oxidation, of the first free magnetic layer 14c and the ferromagnetic layer 62. Furthermore, low-energy ion milling is easily controlled so that the milling is stopped at intermediate positions of the nonmagnetic layer 23 and the nonmagnetic intermediate layer 63 or at the tops of the first free magnetic layer 14c and the ferromagnetic layer 62.

Therefore, the surfaces of the first free magnetic layer 14c and the ferromagnetic layer 62 can be prevented from being removed in the ion milling step, thereby preventing deterioration in the ferromagnetic properties of the first free magnetic layer 14c and the ferromagnetic layer 62.

The low-energy ion milling is defined as ion milling using an ion beam with a beam voltage (acceleration voltage) of less than 1000 V. For example, a beam voltage of 100 V to 500 V is used. In this embodiment, an argon (Ar) ion beam with a low beam voltage of 200 V is used. In the present invention, low-energy ion milling can be used to improve milling controllability as compared with a conventional method.

The milling time is preferably about 20 seconds to 40 seconds, and the milling angle is 30° to 70°, preferably 40° to 60°, with respect to the direction perpendicular to the surfaces of the nonmagnetic layer 23 and the nonmagnetic intermediate layer 63.

On the other hand, for example, when a conventional Ta layer is used for the nonmagnetic layer 23 and the nonmagnetic intermediate layer 63, a layer below these layers cannot be sufficiently protected from oxidation unless the Ta layer is formed to a thickness of as large as about 30 Å to 50 Å because Ta is easily oxidized by air exposure. In addition, Ta is increased in volume by oxidation to increase the thicknesses of the nonmagnetic layer 23 and the nonmagnetic intermediate layer 63 to about 50 Å or more.

In order to remove the thick nonmagnetic layer 23 and nonmagnetic intermediate layer 63 by ion milling, high-energy ion milling is required to cause a great difficulty in controlling the milling in such a manner that only the nonmagnetic layer 23 and the nonmagnetic intermediate layer 63 are removed. As a result, the surfaces of the first free magnetic layer 14c and the ferromagnetic layer 62 formed below the nonmagnetic layer 23 and the nonmagnetic intermediate layer 63 are partially removed to deteriorate the ferromagnetic properties of the first free magnetic layer 14c and the ferromagnetic layer 62.

After the RIE or ion milling the step is finished, the magnetic flux guide layer 17 is formed. First, a thin film layer comprising a ferromagnetic material such as a CoFe alloy, a NiFe alloy, a CoFeNi alloy, a NiFeNb alloy, a Fe—Zr—O alloy, an amorphous Co—Nb—Zr alloy or Co is deposited in a solid film by sputtering over the entire upper surfaces of the nonmagnetic layer 23 and the nonmagnetic intermediate layer 63 or the entire upper surfaces of the first free magnetic layer 14c and the ferromagnetic layer 62 when the nonmagnetic layer 23 and the nonmagnetic intermediate layer 63 are completely removed.

Then, second magnetic-field annealing is performed. In this annealing, the direction of the applied magnetic field is the track width direction (the X direction). In the second magnetic-field annealing, the second applied magnetic field is lower than the exchange anisotropic magnetic field between the antiferromagnetic layer 11 and the first pinned magnetic layer 12a, and the heat treatment temperature is lower than the blocking temperature of the antiferromagnetic layer 11. The magnitude of the second magnetic field is preferably greater than the coercive force of the free magnetic layer 14 and the demagnetizing field of the free magnetic layer 14. Consequently, an exchange anisotropic magnetic field between the antiferromagnetic material layer 60 and the ferromagnetic layer 62 can be oriented in the track width direction (the X direction) while an exchange anisotropic magnetic field of the antiferromagnetic layer 11 is oriented in the height direction (the Y direction). For example, the second heat treatment temperature is 250° C., and the magnitude of the magnetic field is 24 kA/m.

In the ion milling step shown in FIG. 12, when the nonmagnetic layer 23 and the nonmagnetic intermediate layer 63 are completely removed or partially removed to leave portions having a thickness in the range of 0.5 Å to 6 Å, the magnetization direction of a ferromagnetic material thin film serving as the magnetic flux guide layer 17 is oriented in a direction parallel to the magnetization direction of the ferromagnetic layer 62. When the nonmagnetic layer 23 and the nonmagnetic intermediate layer 63 are partially left with a thickness in the range of 6 Å to 11 Å, the magnetization direction of the ferromagnetic material thin film serving as the magnetic flux guide layer 17 is oriented in a direction antiparallel to the magnetization direction of the ferromagnetic layer 62.

Next, a resist mask is patterned by photolithography, and the magnetic flux guide layer 17 is patterned by a milling process. In this step, the optical track width O-Tw of the magnetic head is defined by the width dimension of the front end 17a of the magnetic flux guide layer 17 in the track width direction at the surface F facing the recording medium. In the magnetic detecting element of this embodiment, the optical track width O-Tw is set to 0.1 μm or less, particularly 0.08 μm or less, to make the magnetic head adaptable for a recording density of 200 Gbit/in$^2$ or more.

The length H3 of the rear end portion 17b of the magnetic flux guide layer 17 in the height direction is preferably in the range of 0.1 μm to 0.5 μm.

In patterning the magnetic flux guide layer 17, the nonmagnetic intermediate layer 63, the ferromagnetic layer 62, the nonmagnetic intermediate layer 61 and the antiferromagnetic material layer 60 are processed by milling in accordance with the planar shape of the magnetic flux guide layer 17.

Therefore, the magnetic head is formed, in which as shown in FIGS. 1 and 2, the magnetic flux guide layer 17 extends from the top of the free magnetic layer 14 to the surface facing the recording medium and extends to the rear in the height direction, the magnetic domain control layer 18 is formed below the magnetic flux guide layer 17 to be disposed in front of the multilayer film T1 near the surface F facing the recording medium, and the magnetic domain control layer 19 is formed below the rear end portion 17b of the magnetic flux guide layer 17 to be disposed behind the multilayer film T1 in the height direction.

In the present invention, the nonmagnetic intermediate layer 63, the ferromagnetic layer 62, the nonmagnetic intermediate layer 61, the antiferromagnetic material layer 60, and the ferromagnetic material layer for the magnetic flux guide layer 17 may be laminated substantially evenly around the multilayer film T1 and then patterned, and thus the manufacture is facilitated.

In this embodiment, the nonmagnetic intermediate layer 24, the ferromagnetic layer 25 and the nonmagnetic intermediate layer 26 are interposed between the magnetic domain control layer 18 and the magnetic flux guide layer 17, and the nonmagnetic intermediate layer 27, the ferromagnetic layer 28 and the nonmagnetic intermediate layer 29 are interposed between the magnetic domain control layer 19 and the magnetic flux guide layer 17 (the rear end 17b).

After patterning, the magnetization direction of the magnetic flux guide layer 17 is aligned in the track width direction (the X direction) or a direction antiparallel to the track width direction by magnetic coupling with the magnetic domain control layers 18 and 19.

Since the free magnetic layer 14 is magnetically coupled with the magnetic flux guide layer 17, the magnetization direction of the free magnetic layer 14 is aligned in the track width direction (the X direction) or a direction antiparallel to the track width direction.

Even when only the magnetic flux guide layer 17 and the ferromagnetic layer 62 are patterned so that the width dimension of the front end 17a in the track width direction coincides with the optical track width O-Tw of the magnetic head, and the nonmagnetic intermediate layer 61 and the antiferromagnetic material layer 60 below the magnetic flux guide layer 17 are left without being removed by milling, the magnetic-field detectivity of the magnetic head is less decreased.

The second magnetic-field annealing may be performed after the magnetic flux guide layer 17 is patterned.

Figure 15:
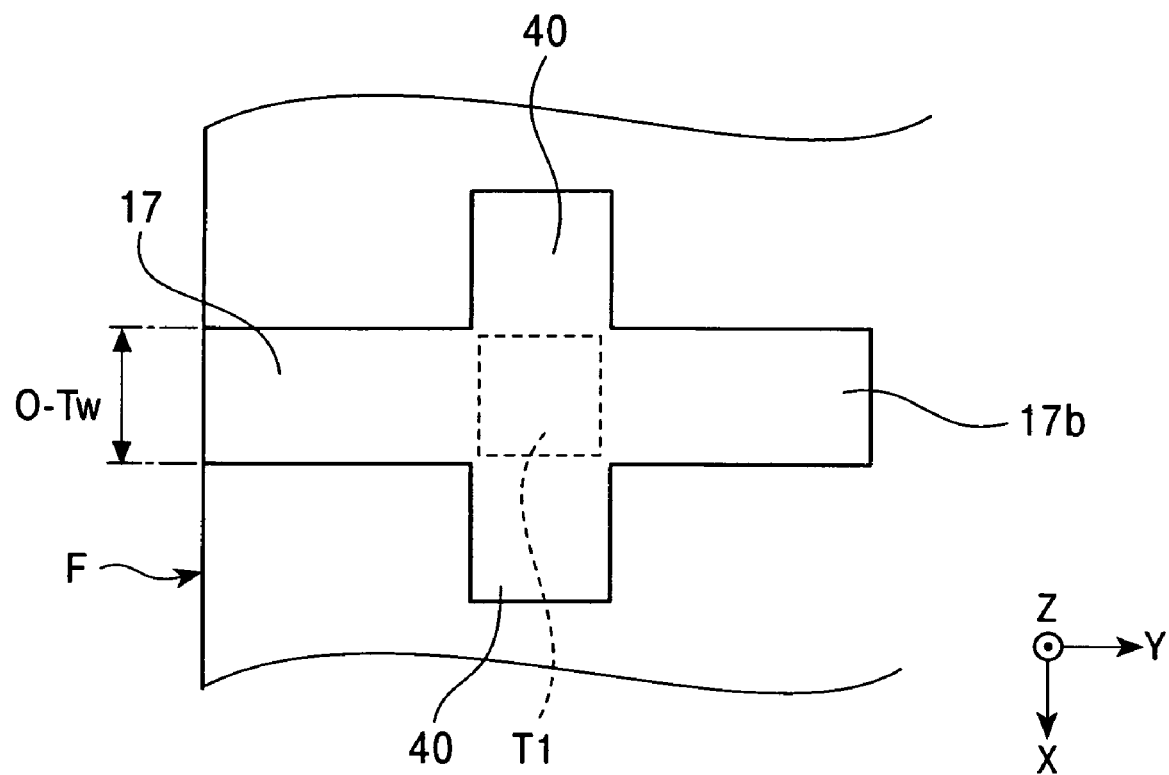
FIG. 15 is a plan view showing a step for manufacturing the magnetic head shown in FIGS. 5 and 6.

In forming the magnetic head shown in FIGS. 5 and 6, a thin film comprising a ferromagnetic material is formed in a solid film after the step shown in FIG. 12, and then patterned in the planar shape shown in FIG. 15. As a result, the magnetic flux guide layer 17 extending from the top of the free magnetic layer 14 to the surface F facing the recording medium and extending to the rear in the height direction, and the tab layers 40 extending on both sides of the multilayer film T1 in the track width direction can be simultaneously formed as an integral layer comprising the ferromagnetic material.

Furthermore, in patterning the magnetic flux guide layer 17 and the tab layers 40, the nonmagnetic intermediate layer 63, the ferromagnetic layer 62, the nonmagnetic intermediate layer 61 and the antiferromagnetic material layer 60 are processed by milling in accordance with the planar shapes of the magnetic flux guide layer 17 and the tab layers 40.

As a result, the magnetic head shown in FIGS. 5 and 6 can be formed, in which the magnetic domain control layers 18 and 19 are formed below the magnetic flux guide layer 17, and the longitudinal bias layers 41 are formed below the tab layers 40 on both sides of the multilayer film T1 in the track width direction.

Furthermore, the nonmagnetic intermediate layers 42, the ferromagnetic layers 43 and the nonmagnetic intermediate layers 44 are interposed between the longitudinal bias layers 41 and the tab layers 40.

After the patterning, the magnetization directions of the magnetic flux guide layer 17 and the tab layers 40 are aligned in the track width direction (the X direction) or a direction antiparallel to the track width direction by magnetic coupling with the magnetic domain control layers 18 and 19 or the longitudinal bias layers 41.

Since the free magnetic layer 14 is magnetically coupled with the magnetic flux guide layer 17 and the tab layers 40, the magnetization direction of the free magnetic layer 14 is aligned in the track width direction (the X direction) or a direction antiparallel to the track width direction.

Even when only the magnetic flux guide layer 17 and the tab layers 40 are patterned in the planar shape shown in FIG. 15, and the nonmagnetic intermediate layer 63, the ferromagnetic layer 62, the nonmagnetic intermediate layer 61 and the antiferromagnetic material layer 60, which are laminated below the magnetic flux guide layer 17 and the tab layers 40, are left without being removed by milling, the magnetic-field detectivity of the magnetic head less deteriorates.

In the above-described manufacturing process, the magnetic domain control layers 18 and 19 and the longitudinal bias layers 40 are made of the same material and have the same thickness.

Another method of manufacturing the magnetic head shown in FIGS. 1 and 2 will be described-below.

First, a multilayer film T is formed in a solid film by the same method as in the step shown in FIG. 9. Next, the first magnetic-field annealing is performed in a magnetic field perpendicular to the track width direction (the X direction).

Figure 16:
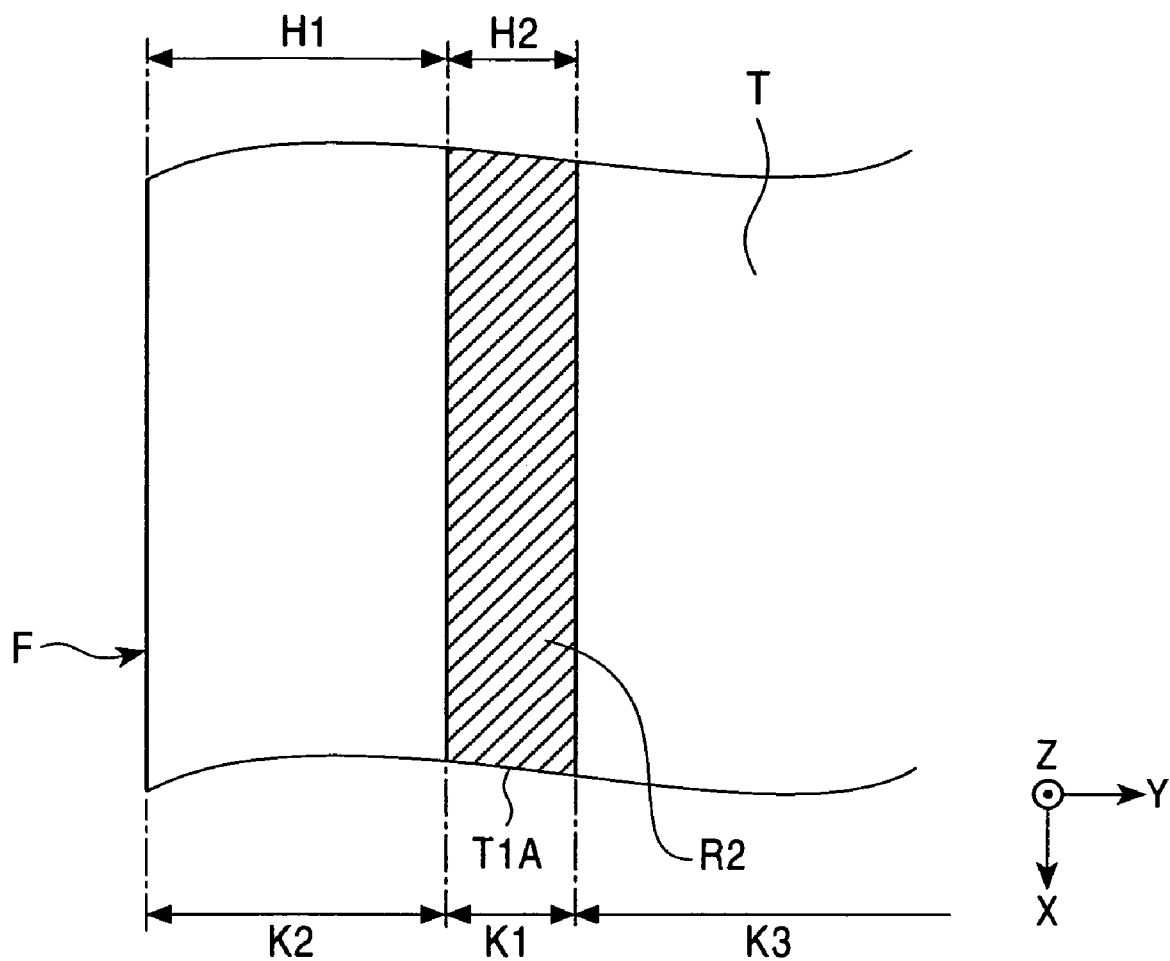
FIG. 16 is a plan view showing another step for manufacturing the magnetic head shown in FIGS. 1 and 2.

As shown in FIG. 16, a stripe resist layer R2 extending in the track width direction (the X direction) is formed at a predetermined distance H1 from a surface turning to the surface F facing the recording medium in the height direction to cover a region K1 having a length H2 in the height direction. The distance H1 is preferably in the range of 0.03 µm to 0.2 µm. The length H2 in the height direction is preferably in the range of 0.05 µm to 0.2 µm. When the step shown in FIG. 16 is performed on a wafer, the surface F facing the recording medium does not appear in the manufacturing process. Therefore, the predetermined distance H1 is expressed by the distance from the surface turning to the surface F facing the recording medium to the resist layer R2.

Then, a region K2 of the multilayer film T near the surface facing the recording medium and a region K3 behind the multilayer film T in the height direction (the Y direction), both regions being not covered with the resist layer R2, are removed by ion milling or reactive ion etching (RIE). A portion where the multilayer film T is left is referred to as a "multilayer film T1A".

Figure 17:
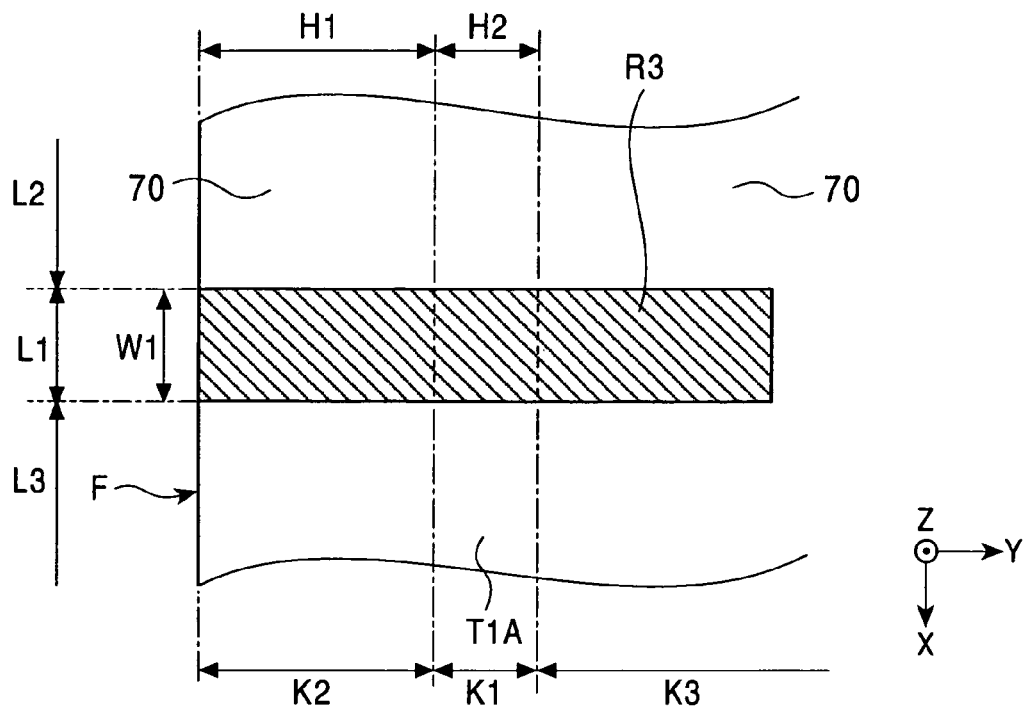
FIG. 17 is a plan view showing still another step for manufacturing the magnetic head shown in FIGS. 1 and 2.

Then, an antiferromagnetic material layer, a nonmagnetic intermediate layer, a ferromagnetic layer and a nonmagnetic intermediate layer are deposited in the region K2 near the surface facing the recording medium and the region K3 behind the multilayer film T in the height direction (the Y direction), both regions being removed by ion milling or reactive ion etching (RIE). In FIG. 17, only the uppermost nonmagnetic intermediate layer is denoted by reference numeral 70. The antiferromagnetic material layer, the nonmagnetic intermediate layer, the ferromagnetic layer and the nonmagnetic intermediate layer are formed to the same thicknesses by using the same materials as those of the antiferromagnetic material layer 60, the nonmagnetic intermediate layer 61, the ferromagnetic layer 62 and the nonmagnetic intermediate layer 63, respectively, shown in FIG. 11.

Next, the resist layer R2 is removed, and then a stripe resist layer R3 extending in the height direction (the Y direction) is formed on the multilayer film T1A and the nonmagnetic intermediate layers 70 to cover a region having a length W1 in the track width direction, as shown in FIG. 17. The length W1 of the resist layer R3 in the track width direction is the same as or slightly larger than the length of the magnetic flux guide layer 17 in the track width direction, the magnetic flux guide layer 17 being formed later. Specifically, the length W1 in the track width direction is 0.06 µm to 0.2 µm, for example, with 100 Gb/in² or more, depending upon the recording format specifications such as the track density, the track pitch, and the like.

Then, both side regions L2 and L3 in the track width direction, which are not covered with the resist layer R3, are removed by ion milling or reactive ion etching (RIE). A portion where the multilayer film T1A is left constitutes the multilayer film T1.

Figure 18:
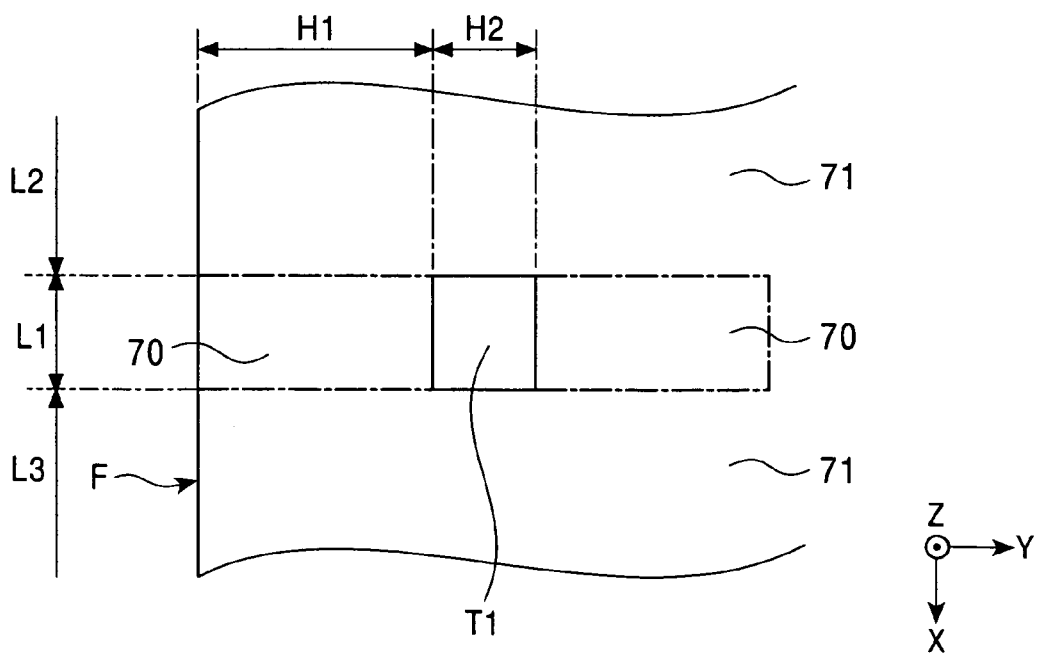
FIG. 18 is a plan view showing a further step for manufacturing the magnetic head shown in FIGS. 1 and 2.

Then, an antiferromagnetic material layer, a nonmagnetic intermediate layer, a ferromagnetic layer and a nonmagnetic intermediate layer are deposited in both side regions L2 and L3 in the track width direction, which are removed by ion milling or reactive ion etching (RIE), and then the resist layer R3 is removed to create the state shown in FIG. 18. In FIG. 18, only the uppermost nonmagnetic intermediate layer is denoted by reference numeral 71. The antiferromagnetic material layer, the nonmagnetic intermediate layer, the ferromagnetic layer and the nonmagnetic intermediate layer are formed to the same thicknesses by using the same materials as those of the antiferromagnetic material layer 60, the nonmagnetic intermediate layer 61, the ferromagnetic layer 62 and the nonmagnetic intermediate layer 63, respectively, shown in FIG. 11.

In the state shown in FIG. 18, the antiferromagnetic material layer, the nonmagnetic intermediate layer, the ferromagnetic layer and the nonmagnetic intermediate layer are laminated around the multilayer film T1. Although the state shown in FIG. 18 is similar to the state shown in FIG. 11, the multilayer film T1 can be more precisely formed with the dimension W1 in the track width direction and the dimension H2 in the height direction by the steps shown in FIGS. 16 to 18.

Figure 14:
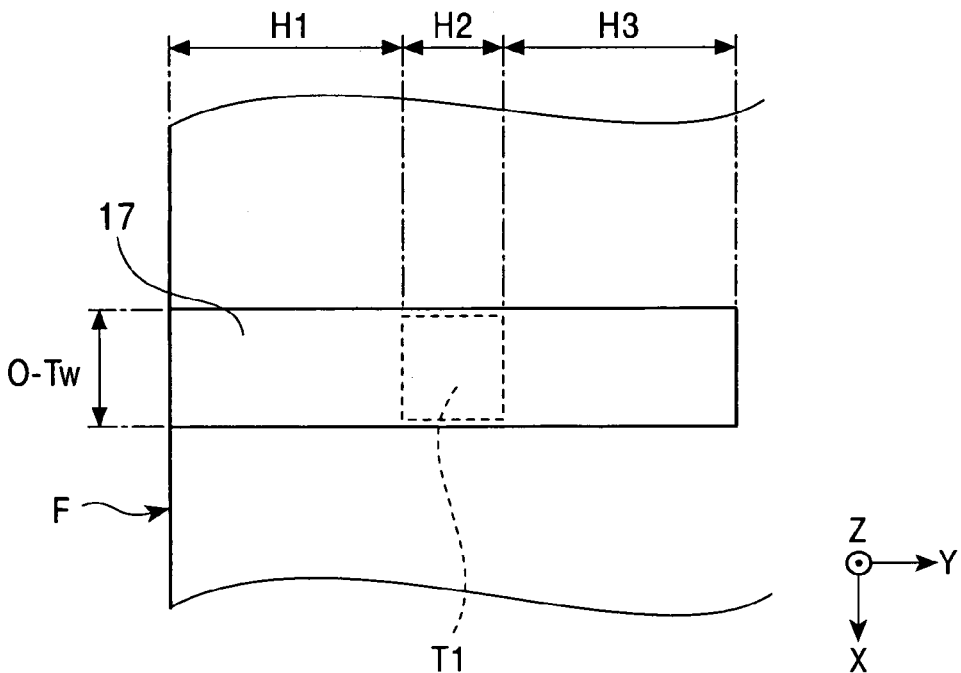
FIG. 14 is a plan view showing a step for manufacturing the magnetic head shown in FIGS. 1 and 2.

After the step shown in FIG. 18, low-energy ion milling is performed by the same method as in the step shown in FIG. 12, and then the magnetic flux guide layer 17 is formed by the same step as that shown in FIG. 14 or 15. Furthermore, the second magnetic-field annealing is performed in a magnetic field in the track width direction.

A magnetic head can also be formed by the manufacturing method below.

First, in the step shown in FIG. 16, a multilayer film T1A is formed, and an antiferromagnetic material layer, a nonmagnetic intermediate layer, a ferromagnetic layer and a nonmagnetic intermediate layer are deposited in the region K2 in front of the multilayer film T1A near the surface facing the recording medium and the region K3 behind the multilayer film T1A in the height direction.

Next, the resist layer R2 is removed, and low-energy ion milling is performed by the same method as in the step shown in FIG. 12. Furthermore, a ferromagnetic material layer 80 for the magnetic flux guide layer 17 is formed in a solid film. Then, the second magnetic-field annealing is performed in a magnetic field in the track width direction.

Figure 19:
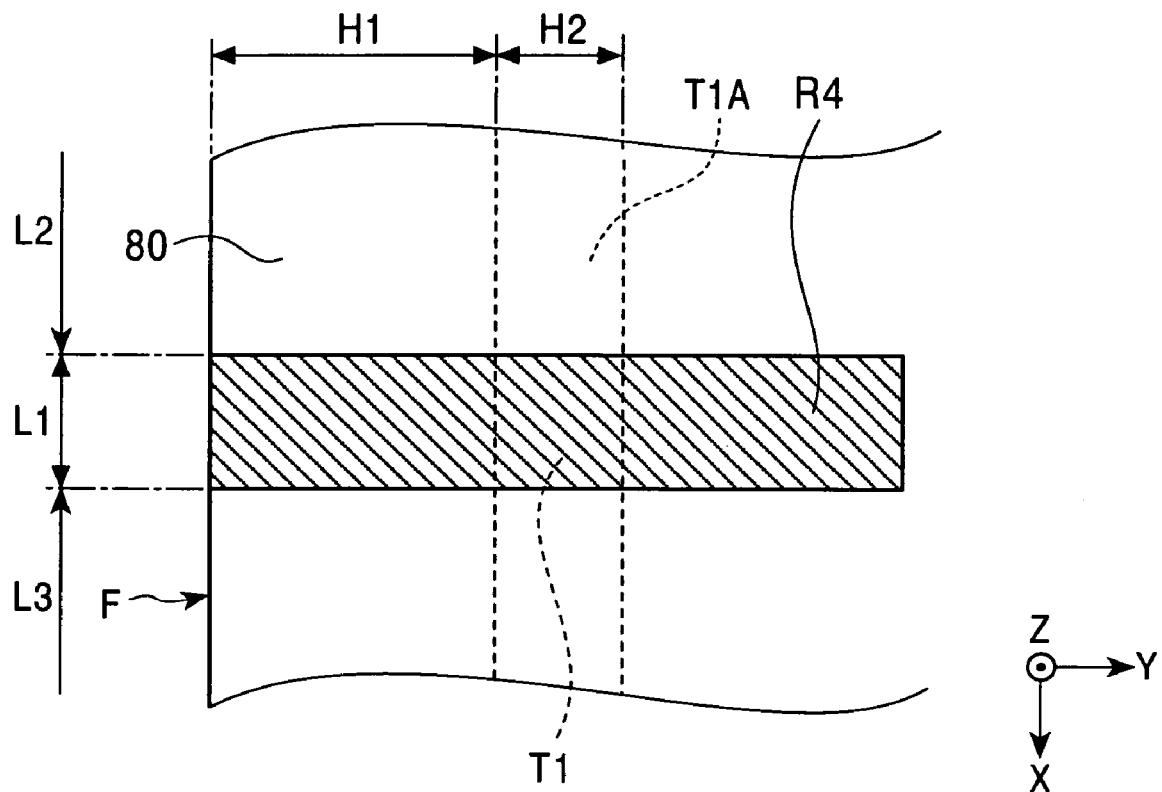
FIG. 19 is a plan view showing a step for manufacturing a magnetic head according to another embodiment of the present invention.

Next, as shown in FIG. 19, a stripe resist layer R4 extending in the height direction (the Y direction) is formed on the ferromagnetic material layer 80 for the magnetic flux guide layer 17 to cover a region having a length L1 in the track width direction. The length L1 of the resist layer R4 in the track width direction is the same as or slightly larger than the length of the magnetic flux guide layer 17 in the track width direction, the magnetic flux guide layer 17 being formed later. Specifically, the length L1 in the track width direction is 0.06 µm to 0.2 µm, for example, with 100 Gb/in² or more, depending upon the recording format specifications such as the track density, the track pitch, and the like.

Then, both side regions L2 and L3 in the track width direction, which are not covered with the resist layer R4, are removed by ion milling or reactive ion etching (RIE). A portion where the multilayer film T1A is left constitutes the multilayer film T1, and the magnetic flux guide layer 17 is formed to extend from the top of the multilayer film T1 to the surface facing the recording medium and extend to the rear in the height direction. In-the ion milling or RIE step, the dimension of the magnetic flux guide layer 17 in the track width direction coincides with the optical track width O-Tw.

Then, an insulating layer comprising an insulating material such as alumina or $SiO_2$ is deposited in both side regions L2 and L3 in the track width direction, which are removed by ion milling or reactive ion etching (RIE). Then, hard bias layers comprising a hard magnetic material are formed on the-insulating layer on both sides of the magnetic flux guide layer 17 in the track width direction, and the resist layer R4 is removed. Then, the hard bias layers are magnetized in the track width direction.

In the magnetic head formed by the above-described manufacturing method, the magnetic domain control layers each comprising an antiferromagnetic material are formed below the magnetic flux guide layer 17, and the hard bias layers are formed on both sides of the magnetic flux guide layer 17 in the track width direction.

Although, in the above description of the method of manufacturing the magnetic head, the step of forming electrode layers is not described, the method further comprises a step of forming a pair of electrode layers at the top and bottom of the multilayer film T1, for example, at the top of the magnetic flux guide layer 17 and the bottom of the underlying layer 21, when the multilayer film T1 serves as the CPP (current perpendicular to the plane) type magnetic detecting element. In this case, the upper shield layer 20 and the lower shield layer 15 may be used as the electrode layers. However, the electrode layers are preferably provided at the top and bottom of the multilayer film T1 through insulating layers having through holes formed in regions corresponding to the top and bottom of the multilayer-film T1.

When the multilayer film T1 serves as the CIP (current in the plane) type magnetic detecting element, the method further comprises a step of forming a pair of electrode layers on both sides of the multilayer film T1 in the track width direction (the X direction shown in the drawing). In the CIP type, insulating layers 31 each comprising alumina or the like are preferably formed before the antiferromagnetic material layer 60 is deposited. Also, the insulating layers 31 are preferably formed in contact with the side surfaces of the multilayer film T1.

When the hard bias layers 52 or the antiferromagnetic layers 53 shown in FIG. 7 or 8 are formed, the hard bias layers 52 or the antiferromagnetic layers 53 are formed on both sides of the region of the magnetic flux guide layer 17, which overlaps with the multilayer film T1, in the track width direction after the magnetic flux guide layer 17 is patterned.

Figure 20:
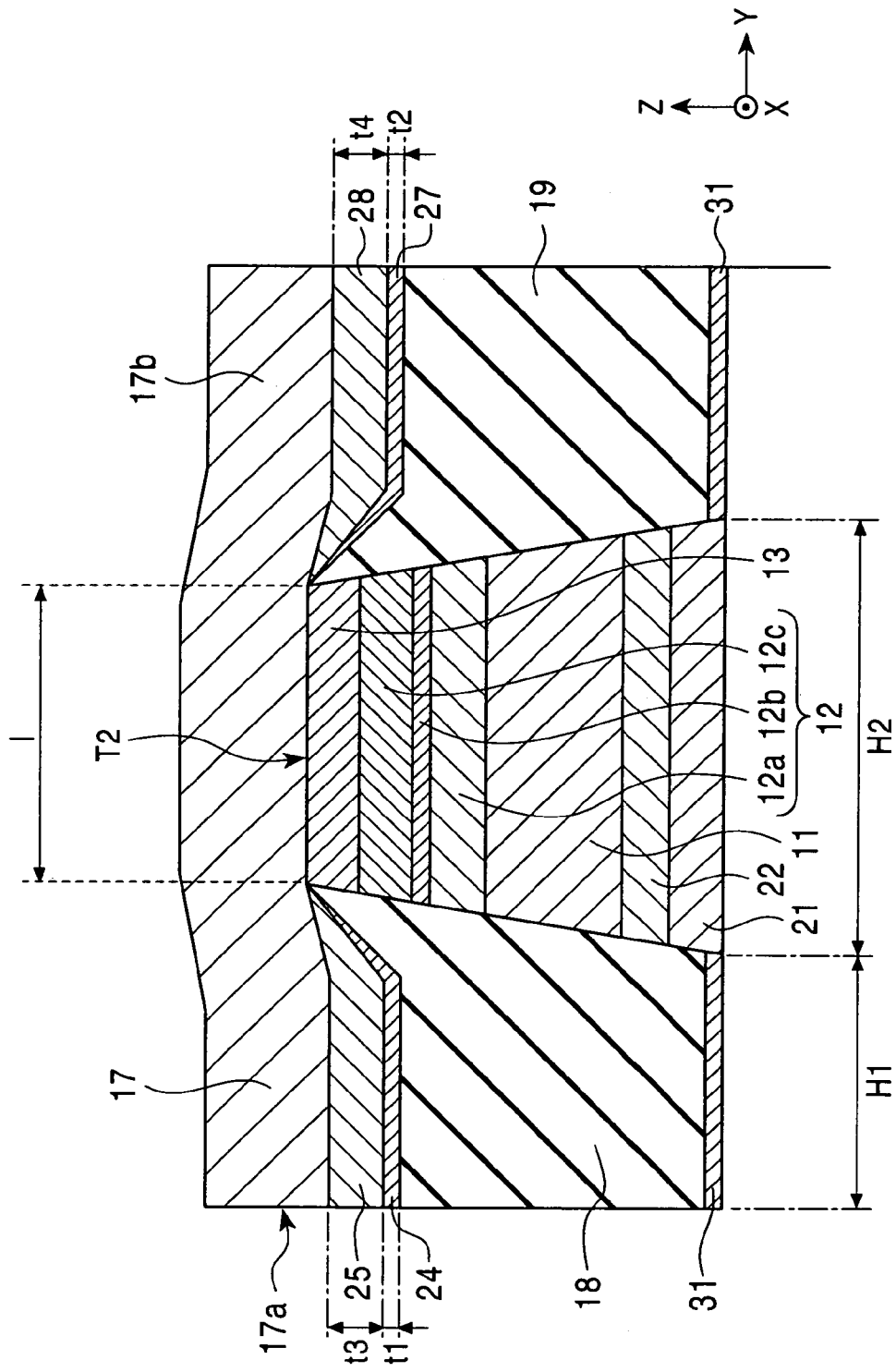
FIG. 20 is a longitudinal sectional view showing a magnetic head according to a seventh embodiment of the present invention.
Figure 21:
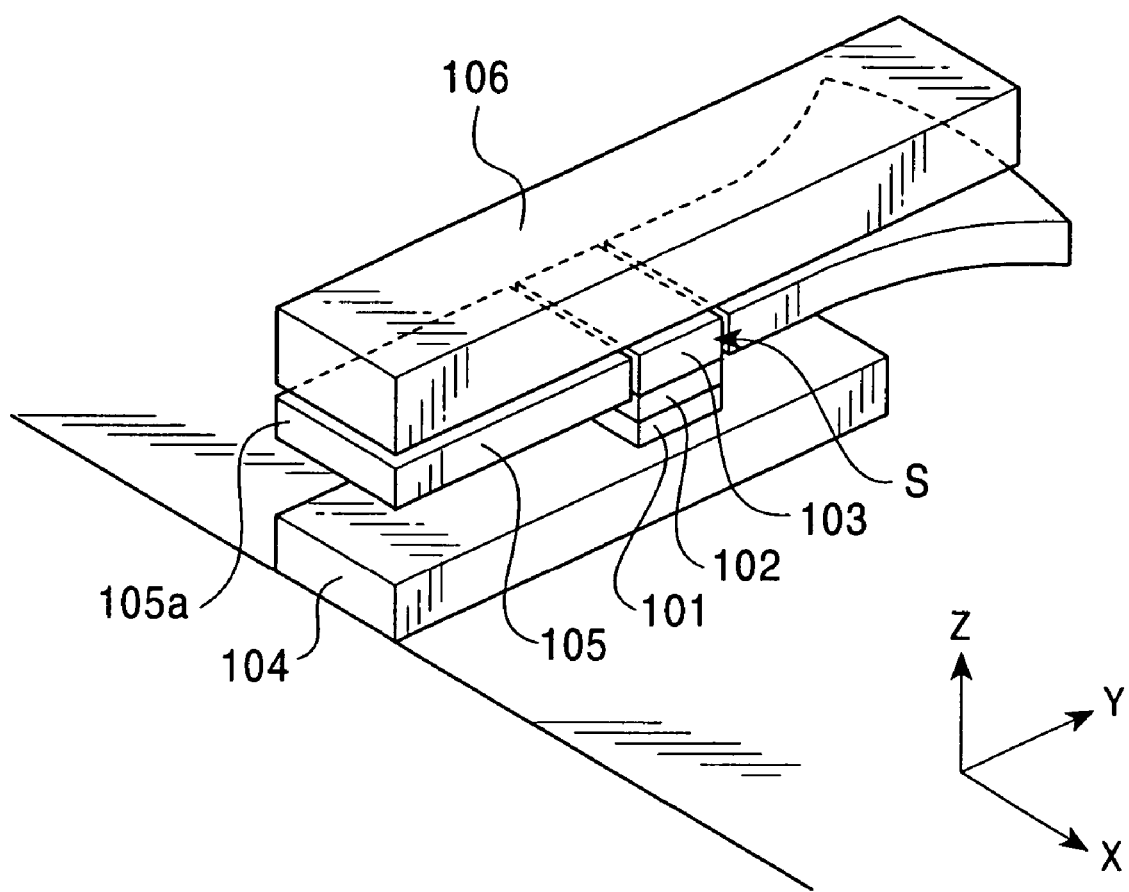
FIG. 21 is a schematic partial perspective view showing a conventional magnetic head.

FIG. 20 is a longitudinal sectional view of a magnetic head according to a seventh embodiment of the present invention, as viewed from a direction perpendicular to the surface facing the recording medium.

The magnetic head of this embodiment is different from the magnetic head shown in FIGS. 1 and 2 in that a multilayer film T2 comprises a pinned magnetic layer 12 and a nonmagnetic material layer 13, and a magnetic flux guide layer 17 is laminated directly on the nonmagnetic material layer 13 without a free magnetic layer provided therebetween. Also, nonmagnetic intermediate layers are not formed between ferromagnetic layers 25 and 28 and the magnetic flux guide layer 17. The multilayer film T2 is formed at a distance H2 from the surface facing the recording medium in the height direction.

The magnetic head of this embodiment comprises the layers each comprising the same material and having the same thickness as those in the magnetic head shown in FIGS. 1 and 2 except that the magnetic flux guide layer 17 is formed directly on the nonmagnetic material layer 13 and the ferromagnetic layers 25 and 28. Also, the length H2 of the multilayer film T2 in the height direction, the dimension (not shown in FIG. 16) in the track width direction and the optical track width O-Tw (not shown in FIG. 16) determined by the front end 17a of the magnetic flux guide layer 17 are the same as those in the magnetic head shown in FIGS. 1 and 2.

In the magnetic head shown in FIG. 20, when the magnetization direction of the magnetic flux guide layer 17 changes with an external magnetic field, the relative magnetization direction of the region I of the magnetic flux guide layer 17, which is disposed on the nonmagnetic material layer 13, and the second pinned magnetic layer 12c changes to change the total electric resistance of the magnetic flux guide layer 17 and the multilayer film T2. The change in the total electric resistance is converted to a current change or voltage change to detect the external magnetic field (recording signal magnetic field).

In this embodiment, the magnetic flux guide layer 17 extends from the top of the nonmagnetic material layer 13 to the surface facing the recording medium, and a magnetic domain control layer 18 is formed below the magnetic flux guide layer 17 to be disposed in front of the multilayer film T2 near the surface F facing the recording medium.

The magnetic flux guide layer 17 also extends to the rear of the multilayer film T2 in the height direction (the Y direction shown in the drawing), and a magnetic domain control layer 19 is formed below the rear end 17b of the magnetic flux guide layer 17, which extends to the rear in the height direction, to be disposed behind the multilayer film T2 in the height direction.

The magnetization direction of the magnetic flux guide layer 17 is aligned in the track width direction (the X direction shown in the drawing) or in a direction antiparallel-to the track width direction due to magnetic coupling with the magnetic domain control layers 18 and 19.

In this embodiment, the magnetic domain control layer 18 is formed in the space below the magnetic flux guide layer 17 and in front of the multilayer film T2 near the surface F facing the recording medium. Therefore, the shape of the magnetic flux guide layer 17 can be made substantially flat, thereby improving the magnetic flux transmission efficiency.

Since the magnetic flux guide layer 17 is laminated on the magnetic domain control layer 18 for controlling magnetization of the magnetic flux guide layer 17, the magnetic domain control layer 18 can be formed in a substantially flat thin film to stabilize a bias magnetic field to be supplied to the magnetic flux guide layer 17.

Also, the magnetic domain control layer 18 is formed in the space in front of the multilayer film T2 near the surface F facing the recording medium, and the magnetic domain control layer 19 is formed in the space behind the multilayer film T1 in the height direction. Therefore, even when the magnetic domain control layers 18 and 19 are formed, an increase in the total thickness dimension of the magnetic head can be suppressed. Namely, the gap length G1 of the magnetic head can be easily kept short. The gap length G1 of the magnetic head is defined by the distance between the lower shield layer and the upper shield layer at the surface F facing the recording medium.

In this embodiment, the rear end 17b of the magnetic flux guide layer 17 extends to the rear of the multilayer film T2 in the height direction, and thus a demagnetizing field of the magnetic flux guide layer 17 in the height direction can be decreased to improve the magnetic field detection sensitivity. However, even when the magnetic flux guide layer 17 is formed only between the top of the free magnetic layer 14 and the surface F facing the recording medium without having the rear end 17b, the magnetic flux guide layer 17 can exhibit the function as the induction layer for inducing a change of magnetization due to the external magnetic field.

The magnetic head shown in FIG. 20 is formed by steps similar to the steps shown in FIGS. 9 to 14.

For example, in the step shown in FIG. 9, the nonmagnetic layer 23 made of Cr or at least one noble metal of Ru, Re, Pd, Os, Ir, Pt, Au, and Rh is deposited directly on the nonmagnetic material layer 13. The thickness of the nonmagnetic layer 23 is about 2 Å to 10 Å, and preferably about 2 Å to 5 Å. When the nonmagnetic material layer 13 is made of Cu, the nonmagnetic layer 23 need not be formed.

Next, first magnetic-field annealing is performed under the same conditions as described above in the step shown in FIG. 9, and then a lift-off resist layer R1 is laminated. Then, a portion of the multilayer film T2 near the surface facing the recording medium and a rear portion in the height direction (the Y direction), both of which are not covered with the resist layer R1, and both side portions in the track width direction (the X direction) are removed by ion milling or the like.

Then, an antiferromagnetic material layer 60 or a hard magnetic material layer comprising a CoPt alloy, a CoCrPt alloy, a CoCrPtTa alloy or a CoCrTa alloy, a nonmagnetic intermediate layer 61, a ferromagnetic layer 62 and a nonmagnetic intermediate layer 63 are continuously deposited by the same method as in the step shown in FIG. 11.

Next, oxide layers formed on the surface of the nonmagnetic layer 23 or the nonmagnetic intermediate layer 13 and the surface of the nonmagnetic intermediate layer 63 are removed by the above-described low-energy ion milling or RIE by the same method as in the step shown in FIG. 12. However, the nonmagnetic intermediate layer 63 may be partially removed to leave a portion having a thickness of 0.5 Å to 6 Å.

After the nonmagnetic layer 23 and the nonmagnetic intermediate layer 63 are removed, the magnetic flux guide layer 17 is formed, and the antiferromagnetic material layer 60, the nonmagnetic intermediate layer 61 and the ferromagnetic layer 62 are patterned. Furthermore, second magnetic-field annealing is performed to cross the magnetization directions of the magnetic flux guide layer 17 and the pinned magnetic layer 12.

Like in the magnetic head shown in FIG. 3, in the magnetic head shown in FIG. 16, the nonmagnetic intermediate layers 24 and 27 need not be formed.

Also, the exchange-type or hard bias-type longitudinal bias layers shown in FIGS. 4 to 8 may be formed on both sides of the region I of the magnetic flux guide layer 17, which is disposed on the nonmagnetic material layer 13, in the track width direction directly or through tab layers formed integrally with the magnetic flux guide layer 17.

In the first magnetic-field annealing step, the material of the nonmagnetic layer 23, i.e., Cr or at least one noble metal of Ru, Re, Pd, Os, Ir, Pt, Au, and Rh, diffuses into the nonmagnetic material layer 13. The diffusion of the material of the nonmagnetic layer 23 can be measured by, for example, a SIMS analyzer, EDX analysis using a transmission electron microscope (TEM), or the like.

Although the present invention is described above with reference to the preferred embodiments, various changes can be made within the scope of the present invention.

The above-described embodiments are only examples and do not restrict the claims of the present invention.

In the above detailed description of the present invention, the magnetic domain control layer is formed below the magnetic flux guide layer, which extends from the top of the free magnetic layer of the multilayer film to the surface facing the recording medium, for aligning the magnetization direction of the magnetic flux guide layer in a direction.

In the present invention, the free magnetic layer is formed on the pinned magnetic layer, and the magnetic flux guide layer is formed on the free magnetic layer. Therefore, a space is formed below the magnetic flux guide layer. In the present invention, the magnetic domain control layer is formed in the space so that the shape of the magnetic flux guide layer can be made substantially flat to improve the flux transmission efficiency.

In the present invention, the magnetization of the magnetic flux guide layer can be controlled only by laminating the magnetic flux guide layer on the magnetic domain control layer, and thus the magnetic domain control layer can be formed in a substantially flat thin film layer, thereby permitting the supply of a stable bias magnetic field.

In the magnetic head of the present invention, the gap length can easily be shortened.

In the present invention, a magnetic domain control layer is preferably formed below the expending portion of the magnetic flux guide layer, which extends to the rear side in the height direction, for aligning the magnetization direction of the magnetic flux guide layer in a direction. In this case, the magnetization of the magnetic flux guide layer can be more securely controlled, and reproduction sensitivity can be improved.

In the present invention; longitudinal bias layers are formed on both sides of the multilayer film in the track width direction so that the longitudinal bias layers are magnetically connected to the free magnetic layer through the magnetic flux guide layer. In this case, the magnetization of the free magnetic layer can be securely controlled.

For example, a tab layer is formed to be magnetically connected to the free magnetic layer through the magnetic flux guide layer, so that the magnetization direction of the tab layer can be aligned in a direction by the longitudinal bias layers formed on both sides of the multilayer film in the track width direction.

What is claimed is:

1. A magnetic head comprising:
    a multilayer film comprising a pinned magnetic layer, a nonmagnetic material layer and a free magnetic layer, which are laminated in that order from the bottom, the multilayer film being disposed at a predetermined distance from a surface facing a recording medium in a height direction; and
    a magnetic flux guide layer comprising a ferromagnetic material and magnetically connected to the free magnetic layer;
    wherein the magnetic flux guide layer extends from a top of the free magnetic layer to the surface facing the recording medium, and a magnetic domain control layer is disposed below the magnetic flux guide layer and in between the multilayer film and the surface facing the recording medium for aligning a magnetization direction of the magnetic flux guide layer in a direction.

2. A magnetic head according to claim 1, wherein the magnetic flux guide layer also extends to a rear of the multilayer film in the height direction, and a magnetic domain control layer is formed below the extending portion of the magnetic flux guide layer, which extends to the rear in the height direction, for aligning the magnetization direction of the magnetic flux guide layer in the direction.

3. A magnetic head according to claim 2, wherein the magnetic domain control layer is disposed behind the multilayer film in the height direction.

4. A magnetic head according to claim 1, wherein a nonmagnetic intermediate layer is interposed between the magnetic domain control layer and the magnetic flux guide layer.

5. A magnetic head according to claim 1, wherein a ferromagnetic, layer is formed between the magnetic domain control layer and the magnetic flux guide layer.

6. A magnetic head according to claim 5, wherein a nonmagnetic intermediate layer is interposed between the magnetic domain control layer and the ferromagnetic layer.

7. A magnetic head according to claim 1, wherein a nonmagnetic layer is formed between the free magnetic layer and the magnetic flux guide layer.

8. A magnetic head according to claim 1, wherein longitudinal bias layers are formed on both sides of the multilayer film in a track width direction to be magnetically connected to the magnetic flux guide layer.

9. A magnetic head according to claim 8, wherein a tab layer extending in the track width direction is formed to be magnetically connected to the magnetic flux guide layer, so that a magnetization direction of the tab layer is aligned in the direction by the longitudinal bias layers formed on both sides of the multilayer film in the track width direction.

10. A magnetic head according to claim 9, wherein the magnetic flux guide layer and the tab layer are formed as a single layer comprising a ferromagnetic material.

11. A magnetic head according to claim 9, wherein the longitudinal bias layers are formed below the tab layer.

12. A magnetic head according to claim 11, wherein a nonmagnetic intermediate layer is interposed between the longitudinal bias layers and the tab layer.

13. A magnetic head according to claim 11, wherein a ferromagnetic layer is formed between the longitudinal bias layers and the tab layer.

14. A magnetic head according to claim 13, wherein a nonmagnetic intermediate layer is interposed between the longitudinal bias layers and the ferromagnetic layer.

15. A magnetic head according to claim 11, wherein a thickness of the magnetic domain control layer is the same as that of the longitudinal bias layers.

16. A magnetic head according to claim 8, wherein the magnetic domain control layer and the longitudinal bias layers comprise the same material.

17. A magnetic head according to claim 8, wherein at least one of the magnetic domain control layer and the longitudinal bias layers comprise an antiferromagnetic material.

18. A magnetic head according to claim 8, wherein at least one of the magnetic domain control layer and the longitudinal bias layers comprise a hard magnetic material.

* * * * *

UNITED STATES PATENT AND TRADEMARK OFFICE
CERTIFICATE OF CORRECTION

| | |
|---|---|
| PATENT NO. | : 7,092,218 B2 |
| APPLICATION NO. | : 10/464708 |
| DATED | : August 15, 2006 |
| INVENTOR(S) | : Naoya Hasegawa et al. |

Page 1 of 1

It is certified that error appears in the above-identified patent and that said Letters Patent is hereby corrected as shown below:

In the Claims

Column 32, in claim 5, line 2, immediately after "ferromagnetic" delete "," (comma).

Signed and Sealed this

Fifth Day of December, 2006

JON W. DUDAS
*Director of the United States Patent and Trademark Office*